United States Patent
Sato et al.

(10) Patent No.: US 8,358,732 B2
(45) Date of Patent: Jan. 22, 2013

(54) CORE CATCHER, MANUFACTURING METHOD THEREOF, REACTOR CONTAINMENT VESSEL AND MANUFACTURING METHOD THEREOF

(75) Inventors: Takashi Sato, Kanagawa (JP); Ryoichi Hamazaki, Kanagawa (JP); Mika Tahara, Kanagawa (JP); Yoshihiro Kojima, Kanagawa (JP); Hirohide Oikawa, Kanagawa (JP); Tomohisa Kurita, Kanagawa (JP); Seiichi Yokobori, Tokyo (JP); Yuka Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 12/195,067

(22) Filed: Aug. 20, 2008

(65) Prior Publication Data
US 2009/0080589 A1 Mar. 26, 2009

Related U.S. Application Data

(63) Continuation-in-part of application No. PCT/JP2007/000115, filed on Feb. 22, 2007.

(30) Foreign Application Priority Data

Feb. 22, 2006 (JP) .................. 2006-044742
Feb. 28, 2006 (JP) .................. 2006-053660
Oct. 13, 2006 (JP) .................. 2006-279969

(51) Int. Cl.
*G21C 9/00* (2006.01)
(52) U.S. Cl. ......... 376/280; 376/283; 376/277; 376/282
(58) Field of Classification Search .................. 376/280, 376/283, 277, 282
See application file for complete search history.

(56) References Cited

U.S. PATENT DOCUMENTS

| | | | |
|---|---|---|---|
| 4,342,621 A * | 8/1982 | Keating, Jr. | 376/298 |
| 5,291,533 A | 3/1994 | Orr | |
| 5,343,506 A * | 8/1994 | Artnik et al. | 376/280 |
| 5,402,456 A * | 3/1995 | Schabert et al. | 376/280 |
| 5,689,538 A * | 11/1997 | Bonhomme | 376/280 |

(Continued)

FOREIGN PATENT DOCUMENTS

DE 43 06 864 A1 9/1994

(Continued)

OTHER PUBLICATIONS

International Search Report issued May 22, 2007, by the Japanese Patent Office for International Patent Application No. PCT/JP2007/000115.

(Continued)

*Primary Examiner* — Ricardo Palabrica
(74) *Attorney, Agent, or Firm* — Finnegan, Henderson, Farabow, Garrett & Dunner, L.L.P.

(57) ABSTRACT

Core debris generated during a molten reactor core in a reactor containment vessel penetrating the reactor containment vessel is configured to be caught by a core catcher located beneath the reactor containment vessel which has a main body having first stage cooling water channels and second stage surrounded by cooling fins extending radially. The number of the second stage cooling channels is larger than that of the first stage cooling channels. Cooling water is supplied from a cooling water injection opening and distributed to the first cooling water channels at a distributor. An intermediate header is formed between the first and the second cooling water channels, and the cooling water is distributed to the second cooling water channels uniformly.

28 Claims, 18 Drawing Sheets

U.S. PATENT DOCUMENTS 5,699,394 A * 12/1997 Schreiber et al. ............. 376/289
5,889,830 A * 3/1999 Hollmann ..................... 376/280
5,907,588 A * 5/1999 Fischer et al. ................ 376/280
6,353,651 B1 * 3/2002 Gou et al. ..................... 376/280

FOREIGN PATENT DOCUMENTS

| | | |
|---|---|---|
| EP | 1 555 677 A2 | 7/2005 |
| EP | 1555677 * | 7/2005 |
| FR | 2 276 663 | 1/1976 |
| FR | 2 435 784 | 4/1980 |
| JP | 63-177096 | 7/1988 |
| JP | 05-134076 A | 5/1993 |
| JP | 06-033098 U | 4/1994 |
| JP | 6-130169 | 5/1994 |
| JP | 06-222177 A | 8/1994 |
| JP | 7-110392 | 4/1995 |
| JP | 7-134193 | 5/1995 |
| JP | 9-500207 | 1/1997 |
| JP | 9-138292 | 5/1997 |
| JP | 9-211166 | 8/1997 |
| JP | 10-511461 | 11/1998 |
| JP | 2001-503135 | 3/2001 |
| JP | 2001-166081 | 6/2001 |
| JP | 2004-333357 | 11/2004 |
| JP | 2005-195595 | 7/2005 |
| WO | WO 98/12709 | 3/1998 |

OTHER PUBLICATIONS

International Search Report from the European Patent Office, for International Application No. PCT/JP2007/000115, filed Feb. 22, 2007.

Supplementary European Search Report issued by the European Patent Office on Mar. 23, 2012, for European Patent Application No. 07713497.1.

U.S. NRC, ESBWR Design Control Document (26A6642AR Rev. 04), Sep. 2007, pp. 5.3-1-5.3-27, available at http://www.nrc.gov.

Excerpt from response to Supplementary Extended European Search Report issued by the European Patent Office on Mar. 23, 2012, for European Patent Application No. 07713497.1, 1 page.

* cited by examiner

CORE CATCHER, MANUFACTURING METHOD THEREOF, REACTOR CONTAINMENT VESSEL AND MANUFACTURING METHOD THEREOF

CROSS REFERENCE TO RELATED APPLICATION

This application is a continuation-in-part application of International Application No. PCT/JP2007/000115, filed Feb. 22, 2007, and claims the benefit of priority from the prior Japanese Patent Application Nos. 2006-44742, 2006-53660 and 2006-279969, filed on Feb. 22, 2006, Feb. 28, 2006 and Oct. 13, 2006, respectively; the entire content of which is incorporated by reference.

BACKGROUND OF THE INVENTION

This invention relates to a core catcher, a manufacturing method of a core catcher, a reactor containment vessel and a manufacturing method of a reactor containment vessel.

In a water cooled reactor, by rundown of water supply into a reactor pressure vessel or a rupture of piping connected to the reactor pressure vessel, a reactor water level may fall, a reactor core may be exposed above the water level and cooling may become insufficient. Supposing such a case, it is designed that a nuclear reactor is shut down automatically under a signal of low water level, the reactor core is covered and cooled by water injected by an emergency core cooling system (ECCS), and a core meltdown accident is prevented.

However, although it is a very low probability, it can be assumed that the above mentioned emergency core cooling system would not operate and any other devices for supplying water to the reactor core would not be available. Under such a condition, the reactor core would be exposed due to lowering of the reactor water level and cooling would be insufficient, fuel rod temperature would rise with decay heat generated continuously after shutdown of the nuclear reactor and the reactor core would meltdown eventually.

If such a severe accident occurs in the nuclear power plant, the molten core would penetrate the reactor pressure vessel lower head at bottom of the reactor pressure vessel and would fall to a floor of reactor containment vessel. Core debris, a wreckage of the molten core, continues to generate heat as about 1% of reactor thermal power because of decay heat of radioactive material that exists inside. Therefore, if there is no means for cooling, the core debris heats concrete stretched on the containment vessel floor. If temperature of contact surface is high, the core debris would react with the concrete and generate large quantity of non-condensable gas, such as carbon dioxide or hydrogen, while melting and eroding the concrete. Eventually, a lot of radioactive material would be emitted to the environment.

The generated non-condensable gas would pressurize and damage the reactor containment vessel and would damage a containment vessel boundary by melting erosion of concrete or reduce structure toughness of the containment vessel. As a result, if the reaction of the core debris and the concrete continues, it would result in a breakage of the containment vessel and a radioactive material in the containment vessel would be emitted to the outside.

In order to suppress such a reaction of core debris and concrete, it is necessary to cool the core debris so that temperature of the surface of the concrete contacting with a bottom of the core debris is below erosion temperature (1500K or less for typical concrete) or to avoid that the core debris contact directly with the concrete. In a conventional way, it is designed to suppress the reaction of melting and eroding the concrete by pouring water over the fallen core debris and lowering temperature of the core debris (for example, refer to Japanese Patent Application Publication 2004-333357 and Japanese Patent Application Publication 2005-195595; the entire content of which is incorporated herein by reference).

Various countermeasures are proposed against falling of the core debris. A typical one is a core catcher. The core catcher catches and holds the fallen core debris on heat resistant material and cools the core debris with means for supplying water.

The core catcher is a safety equipment that assures soundness of the reactor containment vessel by catching the core debris and maintaining it cooled and reduces emission of radioactive material to the outside.

In the existing boiling water nuclear power plants (BWR), the probability of occurrence of an accident is suppressed. And very high safety relating to core cooling during an accident is achieved. Such a severe accident has never occurred. Also in a probability risk analysis (PSA), the probability of occurrence of such a severe accident is evaluated so small as it can be ignored.

Today, a natural circulation cooling type passive safety boiling water reactor (ESBWR) which constitutes all safety systems with static instruments is proposed. In the ESBWR, the core catcher is installed beneath the reactor containment vessel. This is for further improving completeness of the safety of next generation BWR.

If a corium is cooled by boiling of water supplied over the corium at a top surface and a deposition thickness of the corium is so thick, it may not be able to cool the corium fully to the bottom of it. Therefore, it is necessary to make floor area large and to reduce the deposition thickness of the corium so that it can be cooled. However, a structural design of the containment vessel makes it difficult to expand the floor area sufficiently.

For example, typical decay heat of corium is about 1% of rated thermal power. In case of a power reactor of 4,000 MW of rated thermal power, the decay heat is about 40 MW. Although an amount of boiling heat transfer on top surface varies depending on the condition of the top surface of the corium, heat flux of about 0.4 MW/m$^2$ can be assumed as the smallest value. In this case, supposing that heat of the corium is removed only by heat transfer at the top surface, about 100 m$^2$ (11.3 m of a diameter) of floor area is necessary. Therefore, as a thermal power of a plant becomes large, necessary floor area of lower drywell becomes large and it becomes more difficult to design the containment vessel.

In case that cooling water is supplied over the top surface of the core debris fallen to the floor of the reactor containment vessel, if an amount of removable heat at the bottom of the core debris is small, temperature at the bottom of the core debris may remain high because of decay heat and erosion of concrete of the containment vessel floor may be unable to be stopped. Therefore, some methods for cooling from bottom of the core debris are also proposed (for example, refer to Japanese Patent Application Publication 2005-195595, Japanese Patent Application Publication Hei 7-110392, Japanese Patent Application Publication Hei 6-130169 and Japanese Patent Application Publication Hei 9-138292; the entire contents of which are incorporated herein by reference).

The core catcher is located on the floor of the lower drywell with heat resistant member for example so that the core debris does not penetrate the lower part of the reactor containment vessel or radioactive material does not leak. However, the core debris might not be cooled sufficiently only by covering with heat resistant member. And it takes long time and labor to provide a lot of piping for cooling water to run in order to cool the core debris.

If the cooling water is supplied only over the corium, the corium is cooled only by boiling of the water at the top surface of the corium. So, if deposition thickness of the corium is so large, it may be unable to cool sufficiently to the bottom of the corium. Therefore, large floor area is necessary to make the corium as thin as it can be cooled. However, structural design of the containment vessel makes it difficult to provide large enough floor area.

BRIEF SUMMARY OF THE INVENTION

The present invention has been made to solve the above problems, and has an object of this invention is to improve efficiency which cools core debris generated when a reactor core in a reactor vessel melts and penetrates the reactor vessel.

According to an aspect of the present invention, there is provided a core catcher for catching core debris generated when a reactor core in a reactor vessel melts and penetrates the reactor vessel, the core catcher comprising: a main body being placed beneath the reactor vessel and being formed a plurality of cooling channels therein, the cooling channel extending radially so that cooling water supplied from cooling water injecting piping flows therethrough.

According to another aspect of the present invention, there is provided a core catcher for catching core debris generated when a reactor core in a reactor vessel melts and penetrates the reactor vessel, the core catcher comprising: a cooling channel defining a debris holding region and a plurality of cooling water flow paths, the debris holding region being surrounded by a bottom surface inclined against to horizon and a wall spreading vertically at a periphery of the bottom surface and being opened upward, the cooling water flow paths extending parallel to each other with a fixed horizontal width along the bottom surface of the debris holding region as a top surface of the cooling water flow rises; and heat resistant material attached to a surface of the cooling channel facing to the debris holding region.

According to yet another aspect of the present invention, there is provided a reactor containment vessel containing a reactor vessel, the reactor containment vessel comprising: a core catcher for catching core debris generated when a reactor core in a reactor vessel melts and penetrates the reactor vessel, the core catcher having a main body being placed beneath the reactor vessel and being formed a plurality of cooling channels therein, the cooling channel extending radially so that cooling water supplied from cooling water injecting piping flows therethrough.

According to yet another aspect of the present invention, there is provided a reactor containment vessel containing a reactor vessel comprising: a pedestal floor being located beneath the reactor vessel; a pedestal side wall surrounding the pedestal floor and supporting the reactor vessel; and a core catcher placed on the pedestal floor, the core catcher having a cooling channel defining a debris holding region and a plurality of cooling water flow paths, the debris holding region being surrounded by a bottom surface inclined against to horizon and a wall spreading vertically at a periphery of the bottom surface and being opened upward, the cooling water flow paths extending parallel to each other with a fixed horizontal width along the bottom surface of the debris holding region as a top surface of the cooling water flow rises; and heat resistant material attached to a surface of the cooling channel facing to the debris holding region.

According to yet another aspect of the present invention, there is provided a method for manufacturing of a core catcher for catching core debris generated when a reactor core in a reactor vessel melts and penetrates the reactor vessel, the method comprising: a body sub piece manufacturing step for manufacturing body sub pieces being formed a plurality of cooling channels therein; a main body allocation step for allocating the body sub pieces beneath the reactor vessel so that the cooling channels extends radially; and a piping connection step for connecting a cooling water injecting piping to the cooling channels, the cooling water injecting piping configured to supply the cooling water.

According to the present invention, it is possible to improve efficiency which cools core debris generated when a reactor core in a reactor vessel melts and penetrates the reactor vessel.

BRIEF DESCRIPTION OF THE DRAWINGS

The above and other features and advantage of the present invention will become apparent from the discussion herein below of specific, illustrative embodiments thereof presented in conjunction with accompanying drawings, in which.

DETAILED DESCRIPTION OF THE INVENTION

Hereinafter, embodiments of a core catcher according to the present invention will be described with reference to the drawings. The same symbols are given to same or similar configurations, and duplicated descriptions may be omitted. Although first and second embodiments are explained with a natural circulation cooling type passive safety boiling water reactor (ESBWR) as an example, and third through seventeenth embodiments are explained with a boiling water reactor (BWR) as an example, it is applicable to nuclear reactors of other types.

First Embodiment

Figure 3:
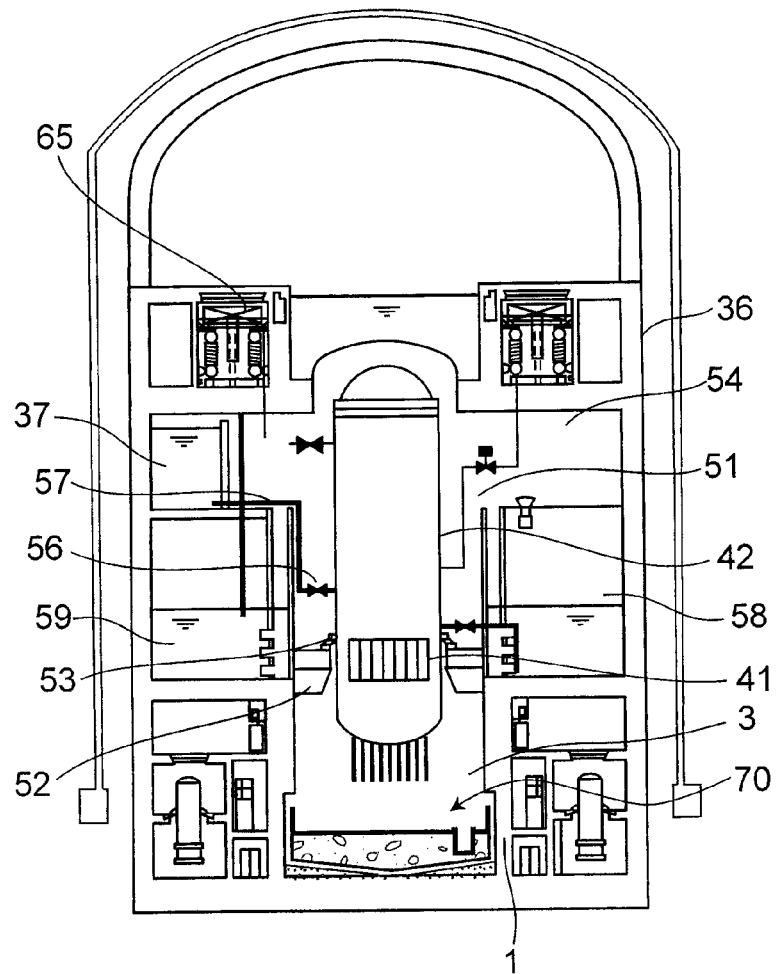
FIG. 3 is a vertical cross sectional view of a reactor containment vessel according to the first embodiment of the present invention.

FIG. 3 is a vertical cross sectional view of a reactor containment vessel according to the first embodiment of the present invention.

Inside of a reactor containment vessel 36, there is a space called drywell 51. A reactor pressure vessel (RPV) 42 is installed in the drywell 51. The reactor pressure vessel 42 is fixed by RPV support 52 with an RPV skirt 53. Higher part of the drywell 51 than the RPV support 52 is called upper drywell 54 and lower part is called lower drywell 3. Wall surrounding the lower drywell 3 is called a pedestal side wall 1. In an ESBWR, the RPV support 52 is supported by the pedestal side wall 1.

A reactor core 41 is contained inside the reactor pressure vessel 42.

A gravity-driven cooling system (GDCS) pool 37 is installed in the upper drywell 54. The GDCS pool 37 and the reactor pressure vessel 42 are connected by piping 57 via a blast valve 56. A pressure suppression chamber 58 is located below the upper drywell 54 and surrounds the reactor pressure vessel 42. Suppression pool 59 is located Inside the pressure suppression chamber 58. A passive containment cooling system (PCCS) pool 65 is located above the drywell 51 and stores cooling water.

A core catcher 70 is installed inside the lower drywell 3 and beneath the reactor pressure vessel 42.

Figure 2:
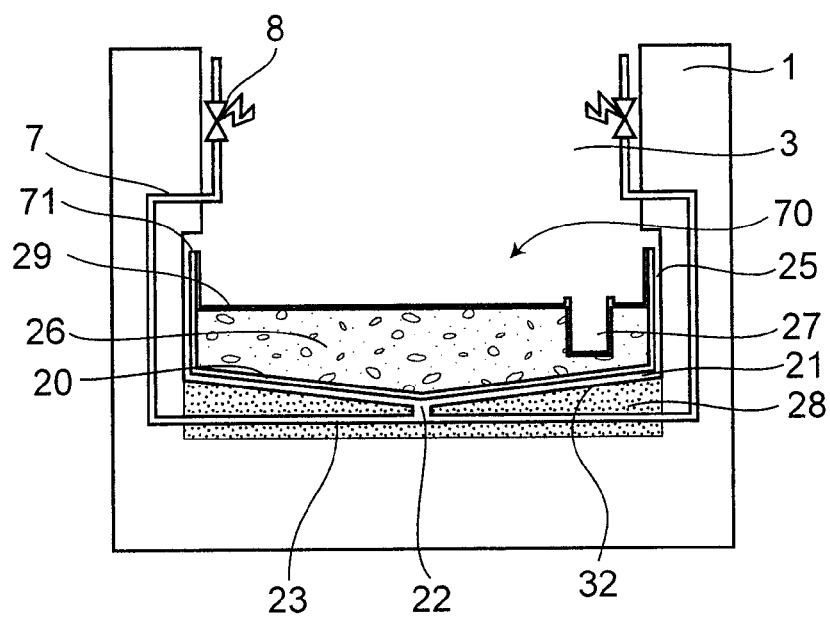
FIG. 2 is a vertical cross sectional view around a core catcher according to the first embodiment of the present invention.

FIG. 2 is a vertical cross sectional view around the core catcher according to this embodiment The core catcher 70 is installed on bottom structure member 28 located in the bottom of the lower drywell 3. This bottom structure member 28 is made of concrete or heat resistant material. A top surface of the bottom structure member 28 has a cone shape which opens upward. The core catcher 70 has a steel main body 20 which has a round dish shape of about 20 cm thick. A base lid 32 is attached to the bottom of the steel main body 20. The base lid 32 has a conical shape which opens upward along the top surface of the bottom structure member 28.

The pedestal side wall 1 is expanded about 50 cm in the radial direction from the bottom end to a certain height that is sufficient to contain the core catcher 70. The core catcher covers whole of the bottom floor of the lower drywell 3.

Cooling channels 21 are formed between the steel main body 20 and the base lid 32.

A cooling water injection opening 22 is formed in a central region of the bottom surface of the steel main body 20 of the core catcher 70. Injection piping 23 is connected to the cooling water injection opening 22. The injection piping 23 is connected to the GDCS pool via the blast valve 8. The injection piping 23 passes inside the bottom structure member 28 and is connected to GDCS submersion piping 7. A part of the GDCS submersion piping 7 passes inside the pedestal side wall 1.

Side wall part channel 25 which rises along with pedestal side wall 1 is formed at a peripheral region of steel main body 20. The top end of this side wall part channel 25 is called as core catcher top end 71.

A heat resistant material layer 26 is formed on the top surface of the steel main body 20 of the core catcher 70. The heat resistant material layer 26 consists of magnesia (magnesium oxide) of about 1.5 m thick for example. Heat resistant material, such as zirconia (zirconium oxide), can be used for the heat resistant material layer 26 instead of magnesia. Drain sump 27 is formed on the top surface of the heat resistant material layer 26.

Top surface of the heat resistant material layer 26 is covered by a sacrifice concrete layer 29 including a region where the drain sump 27 is formed. The surface of the side wall part channel 25 which contacts with the heat resistant material layer 26 is also covered by the sacrifice concrete layer 29 from the top surface of the heat resistant material layer 26 to the core catcher top end 71. Thickness of the sacrifice concrete layer 29 is 10 cm for example.

Figure 1:
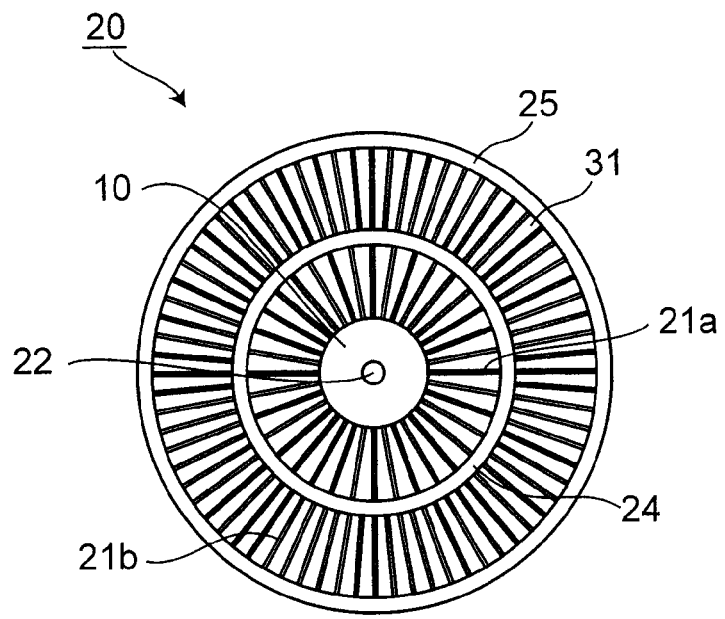
FIG. 1 is a bottom plan view of a steel main body according to a first embodiment of the present invention.

FIG. 1 is a bottom plan view of a steel main body 20 of core catcher 70 according to a first embodiment.

Cooling fins 31 extend radially from the central region and are attached to the bottom surface of the steel main body 20 of the core catcher 70. Width of the cooling fin 31 is constant at about 10 cm for example. The cooling fins 31 are allocated with circumferential intervals extended radially and widen toward the perimeter. The cooling fins 31 constitute cooling channels 21$a$, 21$b$ with the base lid 32.

The steel main body 20 and cooling fins 31 integrated with the steel main body 20 are made of steel and thickness is about 18 cm in total, for example. The thickness of base lid 32 is about 2 cm, for example, and thickness of steel main body 20 is about 40 cm as a whole. The base lid 32 can be made of any material that is watertight and robust. The base lid 32 can be made of steel as well as the steel main body 20 and cooling fins 31.

A round distributor 10 is located in the central region of the bottom surface of the steel main body 20. First stage cooling channels 21$a$ extends radially from the distributor 10. The cooling water injection opening 22 is formed at the central region of the distributor 10. An intermediate header 24 is formed as a ring surrounding the first stage cooling channels 21$a$. Second stage cooling channels 21$b$ extend radially outward from the intermediate header 24. The number of the second stage cooling channels 21$b$ is larger than that of the first stage cooling channels 21$a$. The side wall part channel 25 is formed as a ring surrounding the second stage cooling channels 21$b$.

If the core debris falls to core catcher 70, the cooling water supplied from GDCS submersion water piping 7 and stored in the GDCS pool 37 is led inside the distributor 10 from the cooling water injection opening 22 through the injection piping 23. The cooling water in the distributor 10 is further led inside of the cooling channels 21$a$ extending radially. The cooling water is led to the intermediate header 24. After that, the cooling water is led inside the second stage cooling channels 21$b$ that are more than the first stage cooling channels 21$a$. The number of stages of the cooling channels can be increased or decreased to suit with the size of the core catcher.

After passing through the second stage cooling channels 21$b$, the cooling water goes up inside the side wall part channel 25, overflows from the core catcher top end 71, and flows into space surrounded by the sacrifice concrete layer 29 of which height is about 1.5 m. Thus, the core debris fallen to the core catcher 70 is submerged and cooled.

Then, the water level of the cooling water continues to go up and reaches depth of about 20 m. The cooling water filled over the core catcher 70 is heated with the decay heat of the core debris and a part of the cooling water continues to evaporate.

The generated steam is cooled by a passive containment vessel cooling system pool 65 and becomes condensed water. This condensed water is sent back to the GDCS pool 37, passes through the GDCS submersion water piping 7 and is again used for cooling of the core catchers 70. Thus, the cooling water always re-circulates and supplied to the core catcher 70. And once the depth of the cooling water reaches about 20 m, the depth of the cooling water is maintained almost constant subsequently. Also, the cooling channels 21 of the core catcher are always supplied with the cooling water of low temperature that is cooled by the passive containment vessel cooling system pool 65.

As described above, in this embodiment, by attaching the cooling fins 31, the surface area of the main body of the core catcher 70 becomes large and efficiency of cooling increases. The efficiency of cooling can also be increased by narrowing the width of the cooling fins 31 and increasing the number of installed cooling fins 31 as required.

Since the cooling water is supplied from the cooling water injecting piping 23 connected to the central region of the distributor 10, the cooling water is supplied at the central region that is heated most, and bypassing of a central region can be avoided. Since the number of cooling channels 21 increases with radial position, it can be avoided that a density of the cooling channels is lower in the peripheral region.

The intermediate header 24 formed between two stages of cooling channels 21$a$, 21$b$ is a mixing region where the cooling water which passes through each cooling channel is intermingled. With this intermediate header 24, even if the number of the second stage cooling channels 21$b$ is larger than that of the first stage cooling channels 21$a$, the cooling water can be supplied uniformly to the second stage cooling channels 21$b$.

Since the cooling channels 21 are integrated with the steel main body 20, it has a simple structure and is easy to install to an actual plant. So, time and labor to install large amount of cooling piping in the lower drywell 3 can be saved.

Although the cooling channels have a shape of square tube in this embodiment, they can be formed as other shape, such as a cylindrical tube. For example, the cooling channels can be formed by arranging piping radially and attaching them to the bottom surface of a steel plate. Even in this case, since the cooling water flows through intermediate header 24 etc., time and labor to connect piping can be saved.

According to this embodiment, by installing the sacrifice concrete layer 29, it can be avoided that the heat resistant material separates and disperses in case of normal operation or a design base accident without damage of the reactor core.

When the core debris is cooled with the cooling water, the surface would be solidified and coat-like solid material (crust) would be formed. Therefore, if crust adheres to the side wall part channel 25, void would be formed between the surface of the core debris and crust and efficiency of cooling at the debris surface would decrease. In this embodiment, the sacrifice concrete layer 29 is also allocated near the side wall part channel 25 and is intended to be eroded by the core debris. So, the crust formed at the top surface of the core debris separates and falls from the side wall part channel 25 easily.

The GDCS submersion water piping 7 located near the top of the core catcher where molten reactor core may disperse is laid inside of the pedestal side wall 1 made of concrete. So, heat attack by the core debris can be prevented and a possibility that the GDCS submersion water piping 7 gets damaged is also small.

The pedestal side wall 1 is expanded in the radial direction from the bottom end to a certain height that is sufficient to contain the core catcher 70, while the upper part of the pedestal side wall 1 is not expanded compared with a part where the core catcher 70 is located. Therefore, an area for diffusion of the core debris of the core catcher 70 can be larger and the cooling water to be stored in the GDCS pool can be reduced.

That is, a vicious circle, that expansion of the whole lower drywell to enlarge an area for dispersion of the core debris results in a requirement of expanding a capacity of the GDCS pool 37 for fulfilling whole of the lower drywell and it is necessary to expand an inner diameter of the reactor containment vessel so as to contain the expanded GDCS pool 37, can be avoided.

In an existing reactor containment vessel of which pedestal side wall 1 is not expanded around the bottom end, the quantity of the cooling water to be stored can also be reduced by installing the core catcher 70 after scraping the pedestal side wall 1 to expand space outward for allocating the core catcher 70 in a radial direction.

Since the drain sump 27 is formed at the top of the core catcher 70, the drain sump 27 can coexist with the core catcher 70 without spoiling each function. That is, if a leakage from the reactor pressure boundary occurs during the normal operation, whole of the leakage water is gathered into the drain sump 27, and the leakage that might raise a safety issue can be detected. On the other hand, during an accident accompanied by a reactor core meltdown occurs, even if the drain sump 27 is broken, the core catcher 70 can catch and cool the core debris.

Thus, according to this embodiment, a core catcher of which flow resistance of the cooling water is uniform and that cools a central region effectively can be provided. Also, leakage can be detected because the leakage water is gathered to the drain sump.

In ESBWR of thermal power of 4,500 MWt, if a diameter of an effective area for dispersion of the core debris of the core catcher is expanded to 11.2 m, the area for dispersion of the core debris becomes about 98.5 m². It means that the area for dispersion of the core debris per unit thermal power is about 0.022 m²/MWt.

Second Embodiment

A core catcher according to a second embodiment of the present invention uses subdivided body sub pieces 30 in combination for easy installation.

Figure 4:
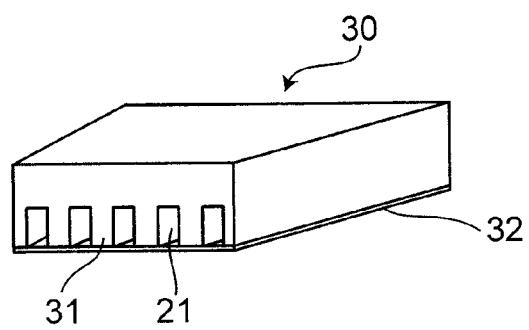
FIG. 4 is a perspective view of a body sub piece according to a second embodiment of the present invention.
Figure 5:
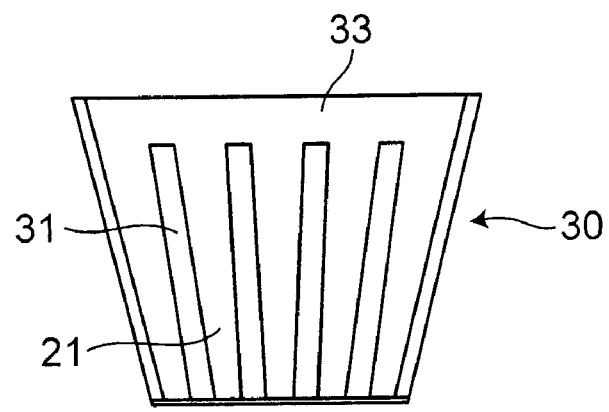
FIG. 5 is a bottom plan view of a body sub piece according to the second embodiment of the present invention.

FIG. 4 is a perspective view of the body sub piece 30 and the base lid 32 according to the second embodiment. FIG. 5 is a bottom plan view of the body sub piece 30 according to the second embodiment.

The cooling fins 31 are formed on a bottom surface of the each body sub pieces 30. The base lid 32 having a same projection shape as the body sub piece 30 is attached to the bottom of the cooling fins 31. Spaces between the cooling fins 31 are the cooling channels 21 through which the cooling water flows.

The body sub pieces 30 and the cooling fins 31 integrated with the body sub pieces 30 are made of steel and thickness is about 18 cm in total, for example. Thickness of the base lid is about 2 cm and the thickness of whole of the body sub piece 30 is about 40 cm for example. The base lid 32 can be made of any material that is watertight and robust. The base lid 32 can be made of steel as well as the body sub pieces 30 and the cooling fins 31. A width of the cooling fins 31 is a constant at about 10 cm, for example. The cooling fins 31 are allocated with circumferential intervals extended radially and widen toward the perimeter.

In FIGS. 4 and 5, although a shape of the body sub pieces 30 and the base lid 32 is illustrated as a trapezoid, it is not limited to a trapezoid.

Figure 6:
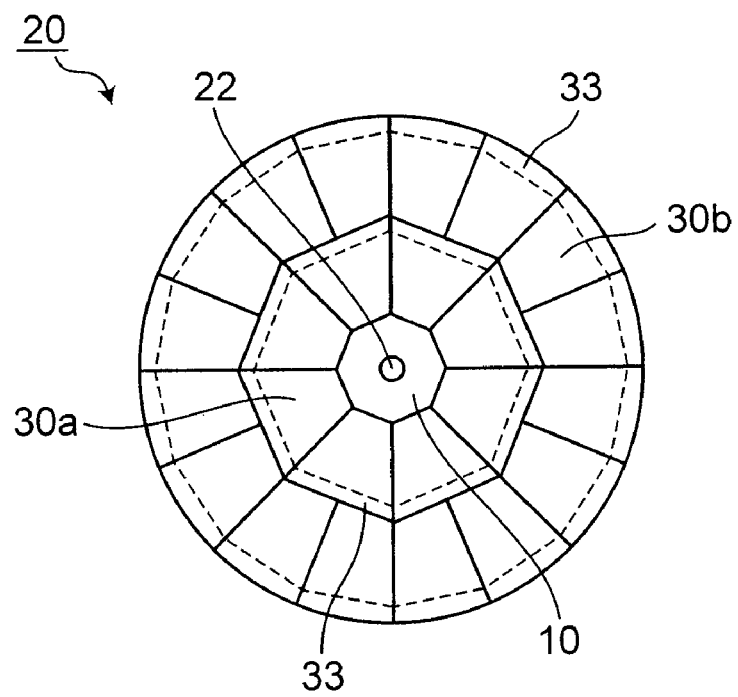
FIG. 6 is a plan view of a core catcher according to the second embodiment of the present invention.

FIG. 6 is a plan view of a core catcher according to the second embodiment.

A steel main body 20 of this embodiment is provided with a distributor 10 of a right octagon, whole of the eight first stage body sub pieces 30a and the sixteen second stage body sub pieces 30b which are arranged substantially as a circle. Although one side of the second stage body sub pieces 30b is illustrated as a part of a circle, the side can be linear.

The body sub pieces 30 are tiled on the bottom structure member 28 (FIG. 1) and constitute a cone-shaped main body 20 as a whole. For example, each of the first stage body sub pieces 30a has a trapezoid top-face shape and eight first stage body sub pieces 30a are arranged along with the outer side of the distributor 10 of octagonal shape. Sixteen second stage body sub pieces 30b are arranged along with outer side of the first stage body sub pieces 30a. Outer sides of the second stage body sub pieces 30b are formed as a part of a circle and are smoothly connected with the pedestal side wall part channel of a cylindrical shape.

The body sub pieces 30 may be subdivided as necessary. For example, if the body sub pieces 30 are subdivided into more pieces, the whole shape of the outer side of the core catcher 70 becomes closer to a circle. In addition, to subdivide the body sub pieces 30 reduces weight and volume of each body sub pieces 30 and results in an improvement of workability during an installation of the core catcher 70.

A gap between the body sub pieces 30 can also be reduced by providing the body sub piece 30 with a protrusion and a depression that fit each other.

Third Embodiment

Figure 8:
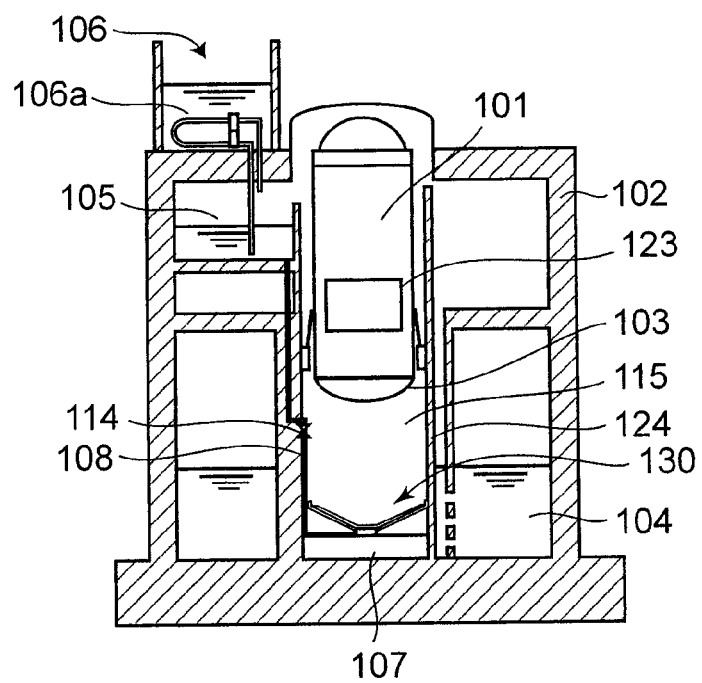
FIG. 8 is a vertical cross sectional view of a reactor containment vessel according to the third embodiment of the present invention.

FIG. 8 is a vertical cross sectional view of a reactor containment vessel according to a third embodiment of the present invention.

A pedestal 115 is formed by a pedestal floor 107 located in the lower part and a surrounding pedestal side wall 124 of cylindrical shape in a reactor containment vessel 102. A reactor pressure vessel 101 containing a reactor core 123 is supported by the pedestal side wall 124.

A suppression pool 104 is surrounding the pedestal side wall 124 in a lower part of the reactor containment vessel 102. The suppression pool 104 stores water.

A molten core cooling device (core catcher) 130 is installed on the pedestal floor 107. Cooling water injection piping 108 is connected to the molten core cooling device 130. The cooling water injection piping 108 is connected to a cistern 105 located in an upper part of the reactor containment vessel 102 via an injection valve 114.

A cooling device 106 is allocated above the reactor containment vessel 102. The cooling device 106 draws steam of the reactor containment vessel 102, condenses with a submerged heat exchanger 106a and returns condensed water to the cistern 105, for example. A static containment vessel cooling instruments or the drywell cooler, etc. can be used as a cooling device 106.

Figure 7:
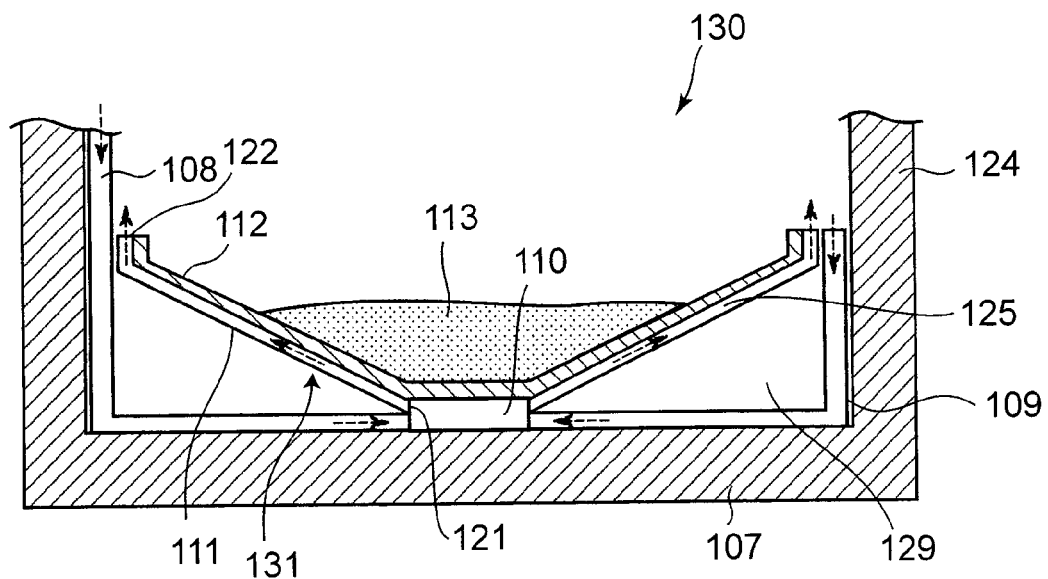
FIG. 7 is a vertical cross sectional view around a pedestal floor according to a third embodiment of the present invention.

FIG. 7 is a vertical cross sectional view around the pedestal floor according to this embodiment. Flow of the cooling water is schematically indicated with a broken line arrow in FIG. 7. An appearance of the corium (core debris) 113 fallen and deposited on the molten core cooling device 130 is also illustrated.

The molten core cooling device 130 is installed on the pedestal floor 107. The molten core cooling device 130 has a water supply chamber 110, a water channel assembly 131, heat resistant material 112 and recirculation piping 109.

The water supply chamber 110 is formed as a hollow disc and located on the pedestal floor 107. The cooling water injection piping 108 is connected to the water supply chamber 110.

The water channel assembly 131 goes up from the water supply chamber 110 with an inclination toward the pedestal side wall 124, rises perpendicularly near the pedestal side wall 124 and has an aperture at the top end. An inner part of the water channel assembly 131 than a peripheral part rising perpendicularly has a conical shape opened upward.

An end of the recirculation piping 109 is opened between the water channel assembly 131 and the pedestal side wall 124. Another end of the recirculation piping 109 is connected to the water supply chamber 110. Although single recirculation piping 109 and single cooling water injection piping 108 are illustrated at the both side of the water channel assembly in FIG. 7, more number of those piping can be installed. Apertures between the water channel assembly 131 and the pedestal side wall 124 except the openings of the recirculation piping 109 and the cooling water injection piping 108 can be covered with a ring shape lid so that the cooling water does not flow into a space 129 below the water channel 111.

The heat resistant material 112 is allocated on an upper surface and an inner surface of a part rising perpendicularly along the pedestal side wall 124 of the water channel assembly 131 so that the whole of the surface is covered.

As the heat resistant material 112, metal oxides, such as $ZrO_2$ and MgO or basalt concrete can be used and they can have a two layer structure of the metal oxide and the concrete for example. As the heat resistant material 112, blocks of a rectangular parallelepiped of such a material can be allocated to cover. A shape of the block is not limited to a rectangular parallelepiped in this case.

Figure 9:
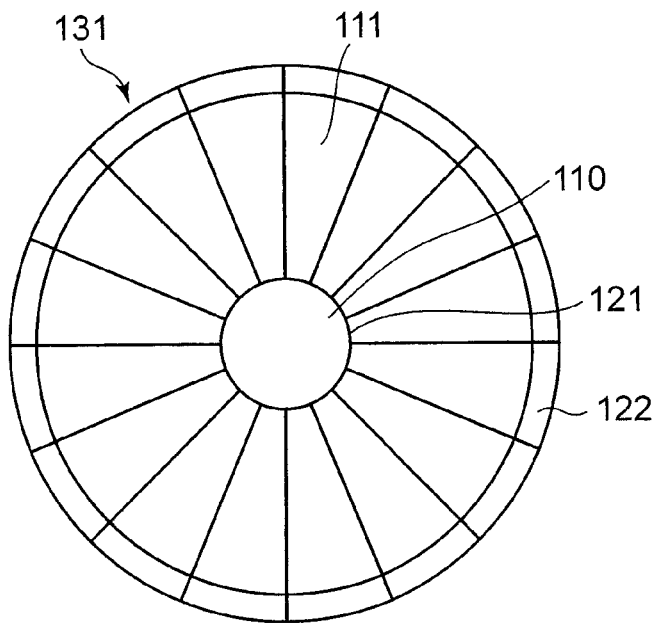
FIG. 9 is a plan view of a water supply chamber and a water channel assembly according to the third embodiment of the present invention.

FIG. 9 is a plan view of the water supply chamber 110 and the water channel assembly 131 according to this embodiment.

The water channel assembly 131 is a combination of a plurality of the water channels 111 surrounding the water supply chamber 110 and extending radially. A projection shape of each water channel 111 is a sector and the water channels 111 contact without a gap with each other. In this embodiment, although the water channel assembly 131 is a combination of sixteen water channels 111 for example, the number of the water channel 111 can be more or less suitably.

Cooling water flow paths 125 formed inside of the water channel 111 spread radially toward perimeter and each of them extends from a lower inlet 121 connected to the water supply chamber 110 to an upper outlet 122.

In this embodiment, although the water channel assembly 131 is formed by combining a plurality of water channels 111, any kind of shape having cooling water flow paths 125 which goes up while spreading from the water supply chamber can be adopted. For example, two plates of conical shape held at a specific distance can be adopted.

If a core meltdown accident occurs and the corium 113 penetrates the reactor pressure vessel bottom head 103 and falls to the pedestal, the corium will be caught by the heat resistant material 112 of the molten core cooling device 130. If the corium 113 falls, the cooling water will be supplied to the water supply chamber 110 and the cooling water will be distributed to each of the water channels 111 from the lower inlet 121.

Heat of hot corium 113 is transferred to the heat resistant material 112, and also is transferred to the cooling water through a wall of the water channel 111. Because the heat of corium 113 is transferred, the cooling water flowing through the cooling water flow paths 125 formed inside of the water channel 111 will be boiled eventually.

Figure 10:
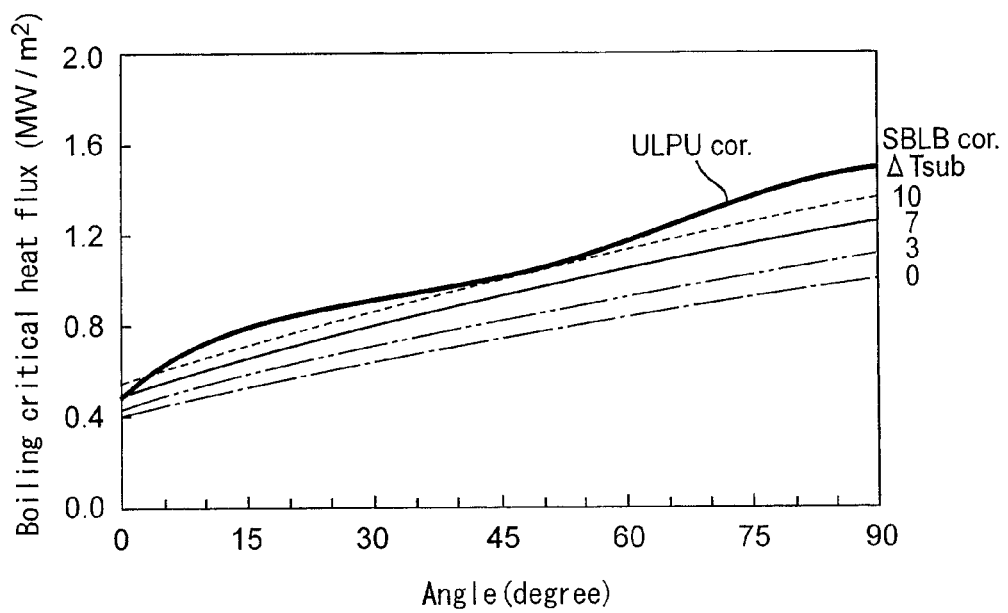
FIG. 10 is a chart illustrating an experimental result of boiling critical heat flux against an angle of a downward heat transfer surface.

FIG. 10 is a graph showing experimental results of boiling critical heat flux against an angle of a downward heat transfer surface shown in Ref. 1. In this figure, "ULPUcor" represents a correlation by a ULPU experiment, "SBLBcor" represents a correlation by a SBLB experiment and "ΔTsub" represents a deviation from a saturation temperature.

Ref. 1: T. G. Theofanous, et. al., "The Coolability Limits of A Reactor Pressure Vessel Lowerhead", 1997, Nuclear Engineering and Design, Volume 169, and p. 59-p. 76

FIG. 10 indicates that boiling critical heat flux of downward heat transfer through a surface inclined 20 degree is about 60% larger than that through a horizontal surface (angle of 0 degree), for example. In this embodiment, since the cooling water flow path 125 is inclined, a steam bubble produced by boiling tends to be detached from an inner surface of the water channel 111 which is a heat transfer surface by buoyancy and a heat transfer coefficient becomes larger.

In this embodiment, since it is taken into consideration to improve removable heat by spreading the corium 113 and to improve easiness of installation concerned with height, the water channels 111 are inclined about 10 degree-about 20 degree from horizon for example.

The cooling water injected into the water channel 111 from the lower inlet 121 goes up through the cooling water flow paths 125 and overflows from the top outlet 122 located in the periphery. Most of the cooling water overflowing from the top outlet 122 flows into a cone part of the water channel assembly 131. The cooling water flowing out of the water channel 111 is spilt on the heat resistant material 112 and forms a water pool on the corium 113. The cooling water forming this water pool is boiled on the surface of the corium 113 and cools the corium 113.

Thus, corium 113 is cooled by both boiling inside water channel 111 and boiling at the surface of corium 113.

Initial water supply to the water supply chamber is carried out by gravity drop of the pool water located higher than the molten core cooling device through the injection piping 108, for example. After completion of the initial water supply, the cooling water spilt on the water channel assembly 131 in the pedestal 115 is supplied to the water supply chamber 110 through the recirculation piping 109 by natural circulation produced by boiling in the cooling water flow paths 125.

Steam generated during cooling of the molten core is condensed by the cooling device 106 installed above the containment vessel and returns to the cistern 105. It is configured that the cooling water which is condensed steam and returns to the cistern 105 is again used for cooling of the corium 113. Natural circulation of water keeps the corium 113 being cooled.

Melting point of the heat resistant material 112, which is about 2700 degree C. if $ZrO_2$ is used as the heat resistant material 112, is higher than temperature of the corium 113 (average melting point is about 2200 degree C.) and a possibility of melting is small. Possibility that the wall of the cooling water channel 111 is damaged is also small because installation of the heat resistant material 112 prevents the corium 113 to contact directly with the cooling water channel 111 and heat resistance of the heat resistant material 112 reduces heat flux.

Thus, the molten core cooling device 130 of this embodiment decreases the temperature of the corium effectively and the corium 113 is stably held inside the molten core cooling device 130.

In addition, erosion reaction of concrete does not occur either because the corium 113 does not contact directly with concrete of the pedestal floor 107. Therefore, a possibility of pressurization due to generation of non-condensable gas such as carbon dioxide, hydrogen, etc. and a possibility that the reactor containment vessel is damaged are reduced.

In this embodiment, since it is organized by the water channel 111, the heat resistant material 112, the water supply chamber 110 and combination of piping such as the cooling water injection piping 108, there is no need to manufacture a large-sized container etc. Therefore, even if it is difficult to carry a big object into the pedestal 115 to install a new molten core cooling device in an existing containment vessel, it is easy to install because each member can be manufactured and brought into the pedestal 115 separately and they can be assembled at an installation location.

Fourth Embodiment

Figure 11:
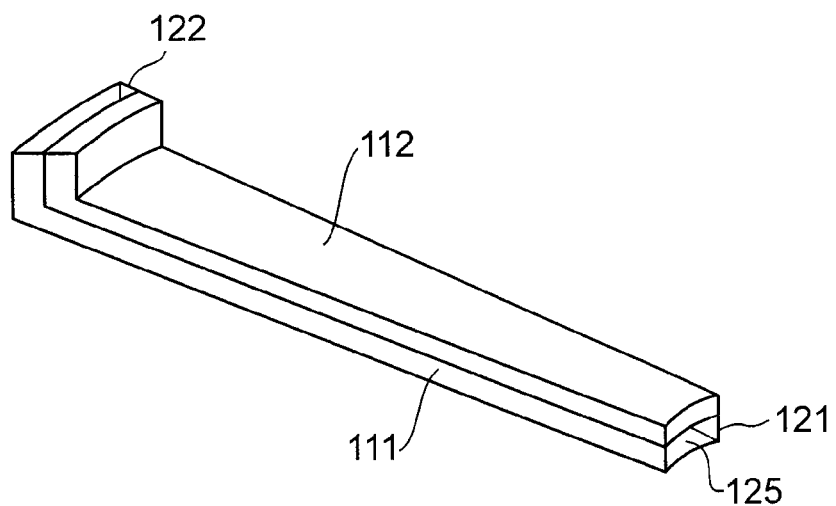
FIG. 11 is a perspective view of a cooling water channel according to a fourth embodiment of the present invention.

FIG. 11 is a perspective view of a water channel 111 according to a fourth embodiment of the present invention.

The water channel 111 of this embodiment is an integration of the water channel of the third embodiment and the heat resistant material 112 sticking to the top surface. Time for installation of the molten core cooling device 130 can be reduced by manufacturing such water channels 111 beforehand at a factory, etc. outside of a nuclear power plant, bringing the water channels 111 inside the pedestal and assembling them.

Many dimples are formed on a wall defining the cooling water flow path 125 inside this water channel 111. These dimples enhance heat transfer at the inner surface of the water channel 111 and the corium can be cooled more quickly.

Fifth Embodiment

A fifth embodiment of the present invention utilizes a water channel assembly 131 that is formed as a convex bowl shape which opens upward instead of conical shape.

Figure 12:
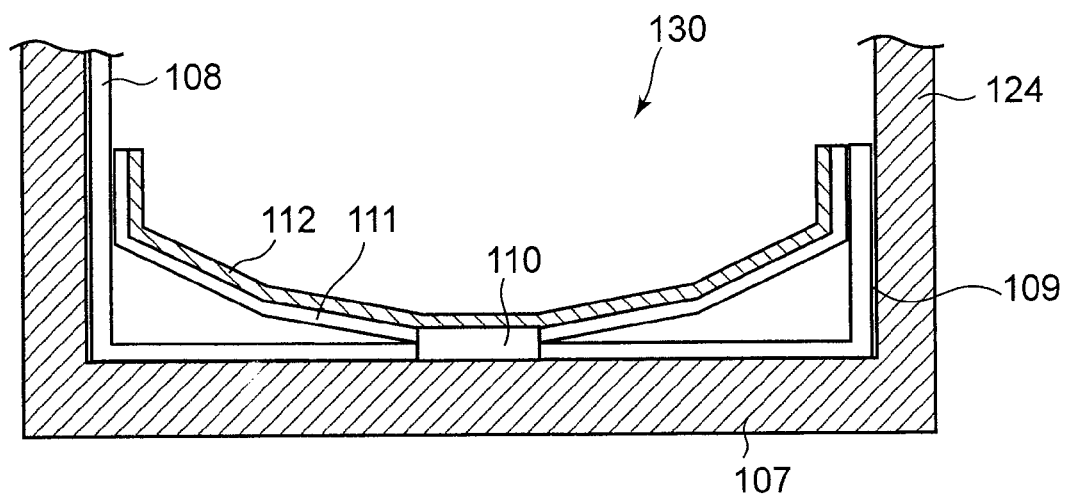
FIG. 12 is a vertical cross sectional view around a pedestal floor according to a fifth embodiment of the present invention.

FIG. 12 is a vertical cross sectional view around a pedestal floor 107 according to the fifth embodiment.

The water channel assembly 131 of this embodiment is formed so that an inclination of the cooling water flow path 125 increases stepwise as approaching from the water supply chamber 110 to the pedestal side wall 124. The water channel assembly 131 is a combination of water channels of which projection shape is a sector, similar to the first embodiment.

As shown in FIG. 10, as an inclination of a cooling surface from horizon increases, boiling critical heat flux increases and cooling capability increases. Therefore, even if an area of the heat resistant material 112 on which the corium is caught and of a top surface of the water channel assembly 131 that cools the corium through the heat resistant material 112 is reduced, it is possible to cool and hold the corium 113 stably.

Sixth Embodiment

A sixth embodiment of the present invention relates especially to a control method of the injection valve 114 attached to the injection piping 108 which supplies the cooling water to the molten core cooling device 130.

Figure 13:
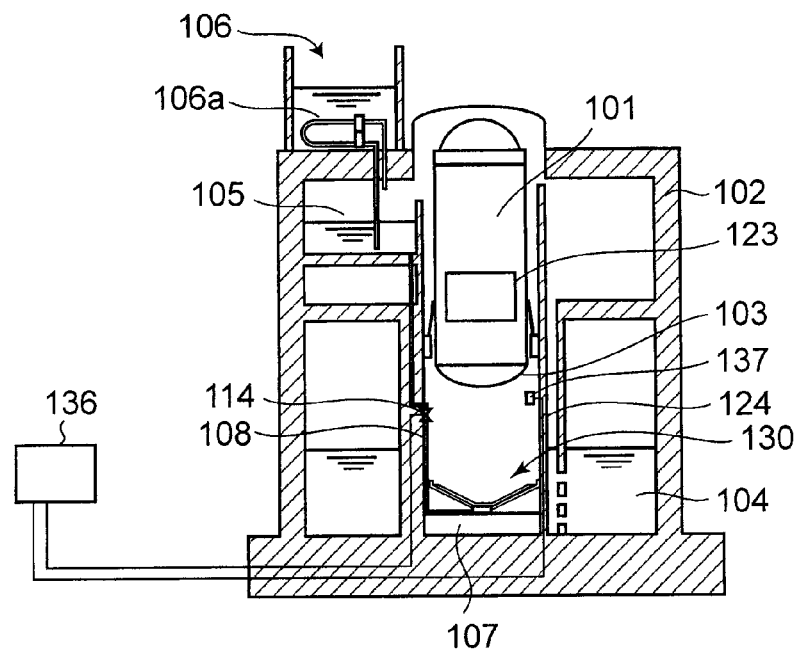
FIG. 13 is an explanatory view of a molten core cooling device illustrated with a vertical cross sectional view of a reactor containment vessel according to a sixth embodiment of the present invention.

FIG. 13 is an explanatory view of a molten core cooling device illustrated with a vertical cross sectional view of the reactor containment vessel according to the sixth embodiment.

An injection valve controller 136 is attached to the injection valve 114. A sensor 137 for detecting an indication that the molten core falls is connected to the injection valve controller 136.

It may be configured that internal pressure of pedestal 115, or other force, opens the injection valve 114 automatically. Although it is configured that the injection valve controller 136 opens the injection valve 114 in this embodiment. If the injection valve controller 136 receives a signal from the sensor 137 and judges that an indication of molten core falling exists, the injection valve controller 136 opens the injection valve 114 and supplies the cooling water to the molten core cooling device 130.

A thermometer which measures pedestal ambient temperature can be used as the sensor 137 and it can be configured that the injection valve controller 136 opens the injection valve 114 if the pedestal ambient temperature exceeds a predetermined temperature. A thermometer which measures temperature of reactor pressure vessel lower head 103 can be used in place of the thermometer which measures pedestal ambient temperature, and it can be configured that the injection valve 114 is opened if the temperature exceeds a predetermined temperature.

A detector which detects a reactor water level can be used as sensor 137 and it can be configured that the injection valve controller 136 judges that an indication of molten core falling exists and opens injection valve 114 if a reactor water level low signal remains for a certain period.

Furthermore, these sensors can be combined as the sensor 137.

In this embodiment, since an indication of molten core falling can be detected by an appropriate sensor and the cooling water can be supplied to the molten core cooling device 130 if a molten core falls, the corium can be cooled immediately.

Seventh Embodiment

Figure 14:
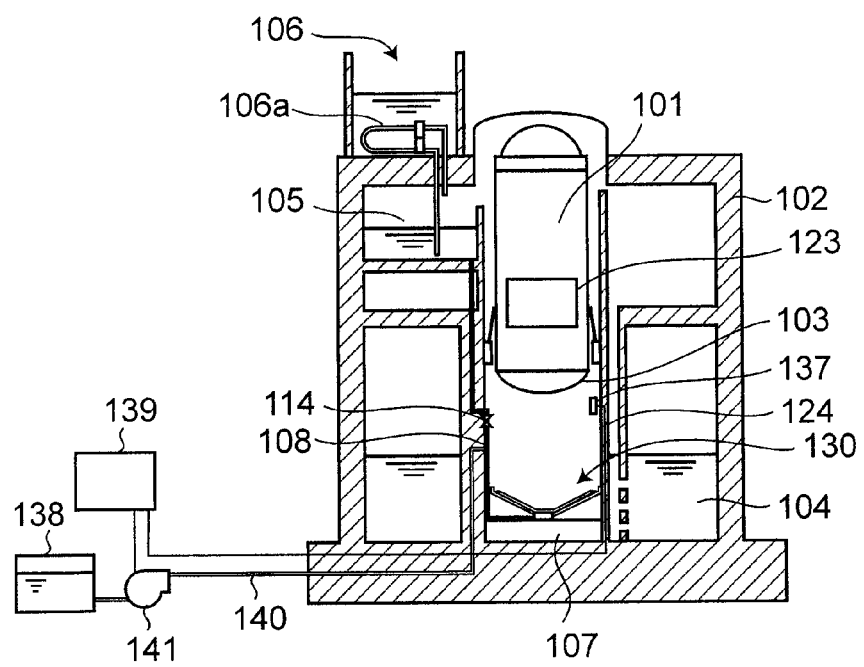
FIG. 14 is a n explanatory view of a core debris cooling device indicating with a vertical cross sectional view of a reactor containment vessel according to a seventh embodiment of the present invention.

FIG. 14 is an explanatory view indicating a molten core cooling device according to a seventh embodiment of the present invention with a vertical cross sectional view of a reactor containment vessel.

In this embodiment, the cooling water injection piping 108 is connected to external cooling water supply piping 140 extending to an external cooling water tank 138. A pump 141 is inserted in the external cooling water supply piping 140. A pump control device 139 is attached to the pump 141.

On detecting an indication of molten core falling, the pump control device 139 starts up the pump 141 and supplies the cooling water from the external cooling water tank 138 to the molten core cooling device 130. Consequently, if external electricity is available for driving the pump 141, not only the cooling water stored in the cistern 105 but also the cooling water stored in the external cooling water tank 138 can be used for cooling of the corium. Therefore, the corium can be cooled more quickly.

Eighth Embodiment

Figure 16:
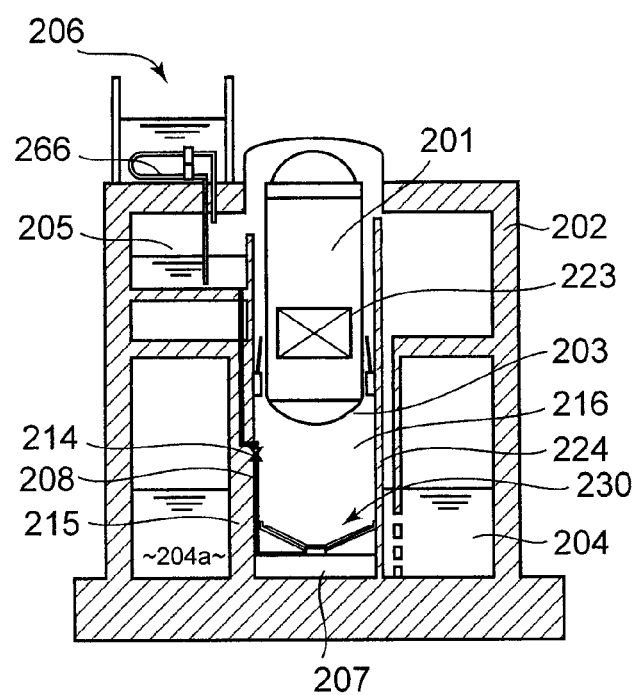
FIG. 16 is a vertical cross sectional view of a reactor containment vessel according to the eighth embodiment of the present invention.

FIG. 16 is a vertical cross sectional view of a reactor containment vessel according to an eighth embodiment of the present invention.

In the lower drywell 216 of the reactor containment vessel 202, a pedestal 215 is formed by a pedestal floor 207 located at the lower part and a surrounding pedestal side wall 224 of cylindrical shape. The reactor pressure vessel 201 containing a core 223 is supported by the pedestal side wall 224.

A suppression pool 204 is formed as surrounding the pedestal side wall 224 in the lower part of the reactor containment vessel 202. The suppression pool 204 stores pool water 204a.

On the pedestal floor 207, a molten core holding device (core catcher) 230 which holds the molten core 213 fallen through the reactor pressure vessel lower head 203 in case of accident is installed. Injection piping 208 is connected to the molten core holding device 230. The injection piping 208 is connected to a cistern 205 located in an upper part of reactor containment vessel 202 via an injection valve 214.

A containment vessel cooling device 206 is installed on the reactor containment vessel 202. The containment vessel cooling device 206 draws steam in the reactor containment vessel 202 to a heat exchanger 266 sunk in water to condense and returns the condensed water to the cistern 205, for example.

As such a containment vessel cooling device 206, a static containment vessel cooling facility or a drywell cooler, etc. can be used.

Figure 15:
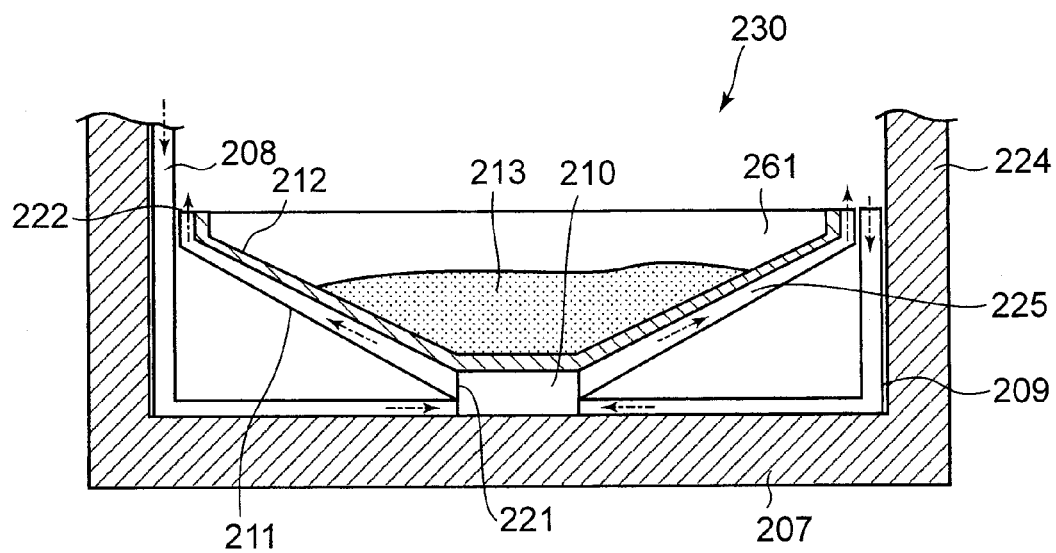
FIG. 15 is a vertical cross sectional view around a pedestal floor according to an eighth embodiment of the present invention.

FIG. 15 is a vertical cross sectional view around the pedestal floor 207 according to the eighth embodiment of the present invention. Flows of the cooling water are indicated in FIG. 15 by an arrow head with a broken line. An appearance of the corium (core debris) 213 fallen and deposited on the molten core holding device 230 is also illustrated.

The molten core holding device 230 is installed on the pedestal floor 207. The molten core holding device structure 230 has a water supply chamber 210, cooling water channels 211, heat resistant material 212 and water supply piping 209.

The water supply chamber 210 is formed as a hollow disc and is installed on the pedestal floor 207. The injection piping 208 is connected to the water supply chamber 210.

The cooling water channel 211 goes up from the water supply chamber 210 with an inclination toward the pedestal side wall 224, rises perpendicularly near the pedestal side wall 224 and opens at a top exit 222 located at the upper end. The cooling water flow paths 225 are formed inside of the cooling water channel 211. Height of the cooling water flow path 225 is largest at the connection with the water supply chamber 210 and decreases as approaching to the perimeter. A space inner than the vertical part at the perimeter of the cooling water flow channel 211 is a debris holding region 261 which has a conical shape opening upward.

The water supply piping 209 has an aperture at an end between the cooling water channel 211 and the pedestal side wall 224. The other end of the water supply piping 209 is connected to the water supply chamber 210.

The heat resistant material 212 is allocated on the upper surface and the vertical surface toward the center along the pedestal side wall of the cooling water channel 211 so as to cover whole of this area. $ZrO_2$ can be used as the heat resistant material 212 for example.

Figure 17:
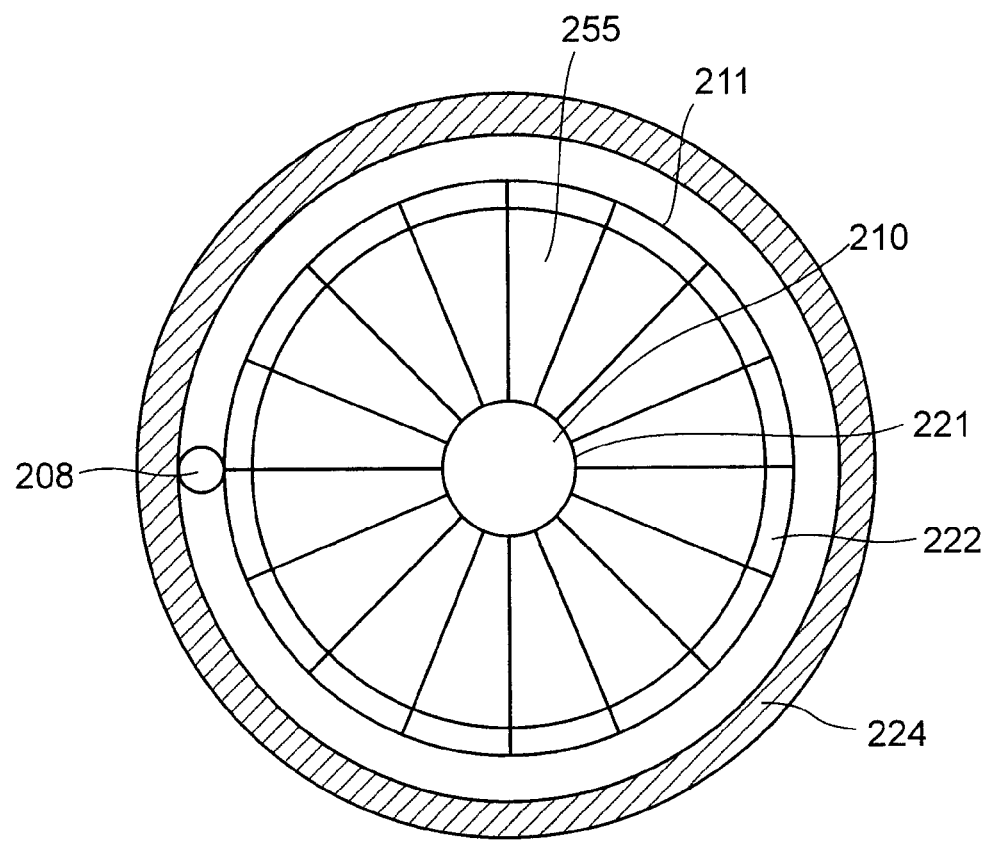
FIG. 17 is a plan view around a cooling channel according to the eighth embodiment of the present invention.

FIG. 17 is a plan view around the water supply chamber 210 according to the eighth embodiment. In FIG. 17, illustration of the heat resistant material 212 is omitted.

Tubular bodies 255 form the cooling water channel 211. Tubular bodies 255 extend radially around the water supply chamber 210 and are allocated without clearance. The cooling water flow paths 225 formed inside of the cooling water channel 211 spread in circumferential direction toward the perimeter from the lower inlet 221 connected to the water supply chamber 210 and extend to the top exit 222.

If a core meltdown accident occurs, the corium 213 that penetrates the reactor pressure vessel lower head 203 and falls to the lower drywell 216 is caught by the heat resistant material 212 of the molten core holding device 230. If the corium 213 falls, the cooling water is supplied to water supply chamber 210 and the cooling water is distributed to each cooling water flow path 225 through the lower inlet 221.

Heat of the high temperature corium 213 is transferred to the heat resistant material 212 and is transferred to cooling water through the wall of the cooling water channel 211. Since being transferred the heat of the corium 213, the cooling water flowing through the cooling water flow paths 225 is eventually boiled.

FIG. 10 indicates that boiling critical heat flux of downward heat transfer through a surface inclined 20 degree is about 60% larger than that through a horizontal surface (angle of 0 degree), for example. In this embodiment, since the cooling water flow path 225 is inclined, a steam bubble produced by boiling tends to be detached from an inner surface of the water channel 211 which is a heat transfer surface by buoyancy and a heat transfer coefficient becomes larger.

Figure 18:
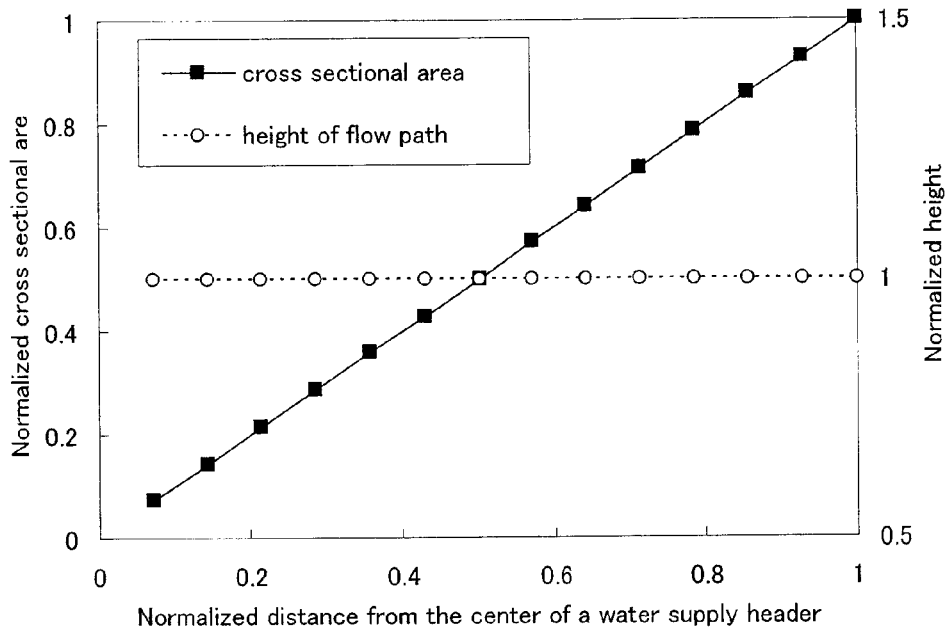
FIG. 18 is a graph showing an example of relation between distance from a water supply header core and a sectional area of a cooling channel flow path assuming a height of the cooling channel is constant.
Figure 19:
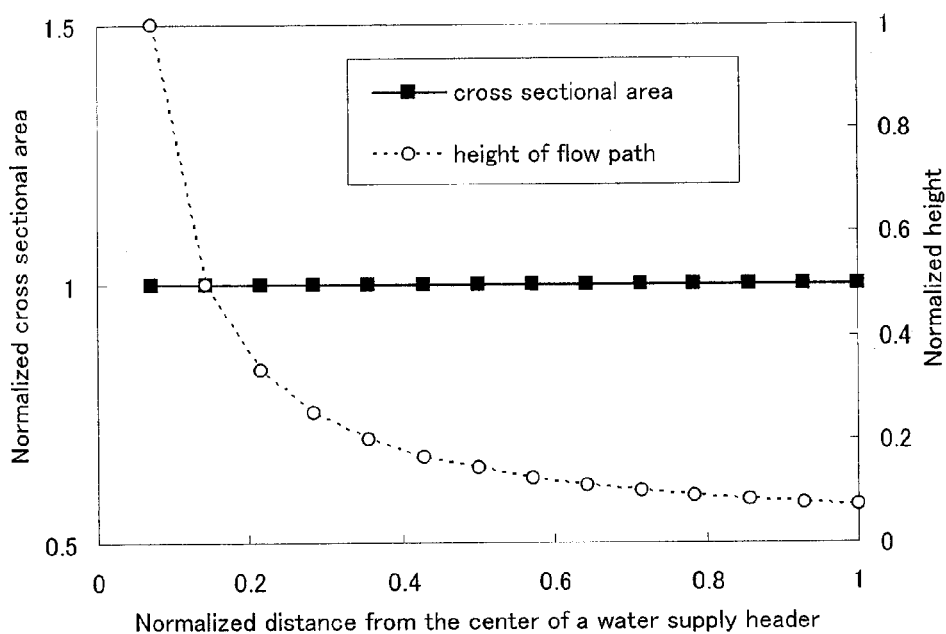
FIG. 19 is a graph showing an example of relation between distance from a water supply header core and a height of the cooling channel assuming a sectional area of a cooling channel flow path is constant.

FIG. 18 is a graph showing an example of relation between distance from the center of a water supply header and a sectional area of a cooling channel flow path assuming a height of the flow path in the cooling channel is constant. FIG. 19 is a graph showing an example of relation between distance from the center of a water supply header core and a height of the flow path in the cooling channel assuming a sectional area of a cooling channel flow path is constant.

Assuming that height of the cooling water flow path 225 is constant in a radial direction, a cross sectional area of the cooling water flow path 225 is proportional to a square of distance from the center of the water supply chamber 210. Therefore, flow velocity of the cooling water flowing through the cooling water flow paths 225 tends to be smaller as approaching the perimeter. However, in this present embodiment, since the height of the cooling water flow path 225 decreases as approaching the perimeter, increase of the cross sectional area of the cooling water flow path 225 is suppressed. For example, as shown in FIG. 19, the cross sectional area of the cooling water flow path 225 can be kept constant. The cross sectional area of the cooling water flow path 225 can also be smaller as approaching the perimeter.

It is possible to suppress decrease of the flow velocity through the cooling water flow path 225 by suppressing increase in the cross sectional area of cooling water flow path 225 as described above. That is, it can be suppressed to decrease in the cooling water per unit area and per unit time which contributes to remove heat as approaching the perimeter. Therefore, a local rise of temperature of the molten core holding device 230 can be suppressed.

The cooling water flowing into the cooling water channel 211 from the lower inlet 221 goes up through the cooling water flow paths 225 and it overflows from the top exit 222 located in the perimeter. The great portion of the cooling water overflowed from the top exit 222 flows over a cone shape part of the molten core holding device 230. The cooling water running out from the cooling water channel 211 is spilt on the heat resistant material 212 and forms a water pool on the corium 213. The cooling water which forms the water pool boils at the surface of the corium 213 and cools the corium 213.

In this manner, the corium 213 is cooled by both boiling inside the cooling water channel 211 and boiling at the surface of the corium 213.

Initial water supply to the water supply chamber is carried out by gravity drop of the pool water located higher than the molten core cooling device through the injection piping 208, for example. After completion of the initial water supply, the cooling water spilt on the molten core holding device 230 in the pedestal 215 is supplied to the water supply chamber 210 through the water supply piping 209 by natural circulation produced by boiling in the cooling water flow paths 225. Since the water supply piping 209 is piping which circulates the cooling water, it can also be called as the circulation piping.

Steam generated during cooling of the molten core is condensed by the cooling device 206 installed above the reactor containment vessel 202 and returns to the cistern 205. It is configured that the cooling water which is condensed steam and returns to the cistern 205 is again used for cooling of the corium 213. Natural circulation of water keeps the corium 213 being cooled.

Melting point of the heat resistant material 212, which is about 2700 degree C. if $ZrO_2$ is used as the heat resistant material 212, is higher than temperature of the corium 213 (average melting point is about 2200 degree C.) and a possibility of melting is small. Possibility that the wall of the cooling water channel 211 is damaged is also small because installation of the heat resistant material 212 prevents the corium 213 to contact directly with the cooling water channel 211 and heat resistance of the heat resistant material 212 reduces heat flux.

Thus, the molten core holding device 230 of this embodiment decreases the temperature of the corium effectively and the corium 213 is stably held inside the molten core holding device 230.

In addition, erosion reaction of concrete does not occur either because the corium 213 does not contact directly with concrete of the pedestal floor 207. Therefore, a possibility of pressurization due to generation of non-condensable gas such as carbon dioxide, hydrogen, etc. and a possibility that the reactor containment vessel is damaged are reduced.

Ninth Embodiment

Figure 20:
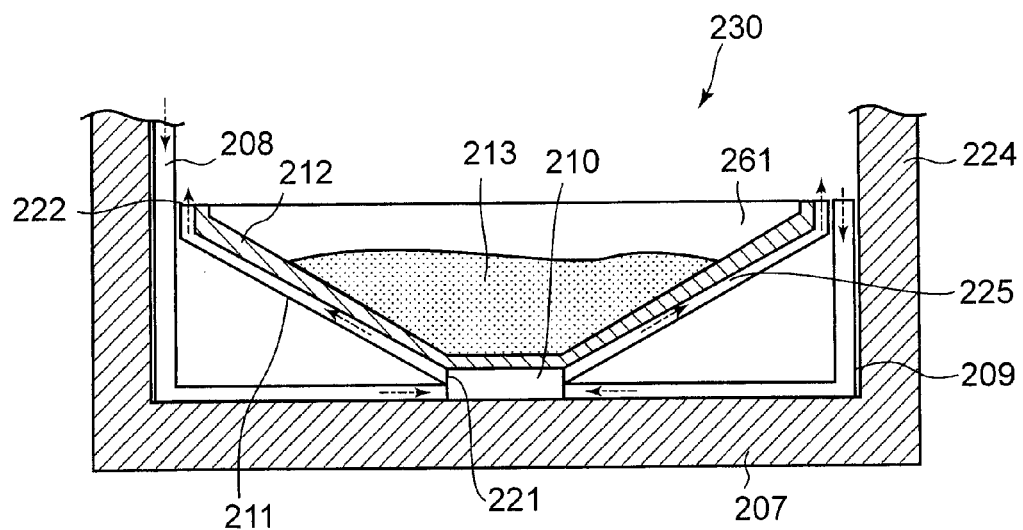
FIG. 20 is a vertical cross sectional view around a pedestal floor according to a ninth embodiment of the present invention.

FIG. 20 is a vertical cross sectional view around a pedestal floor 207 according to a ninth embodiment of the present invention.

In the molten core holding device 230 according to this embodiment, laying thickness of the heat resistant material 212 increases as approaching to the perimeter.

The laying thickness of the heat resistant material 212 may not change continuously and may change discontinuously by using heat resistant blocks of different thickness or layering heat resistant blocks.

In such molten core holding device, heat transfer from the corium 213 to the cooling water is reduced at the peripheral region where cross sectional area in the cooling water channel 211 is larger and flow velocity of the cooling water is smaller. Therefore, local rise of temperature of the cooling water channel 211 can be reduced and it is possible to hold the molten core stably and to cool continuously.

Tenth Embodiment

Figure 21:
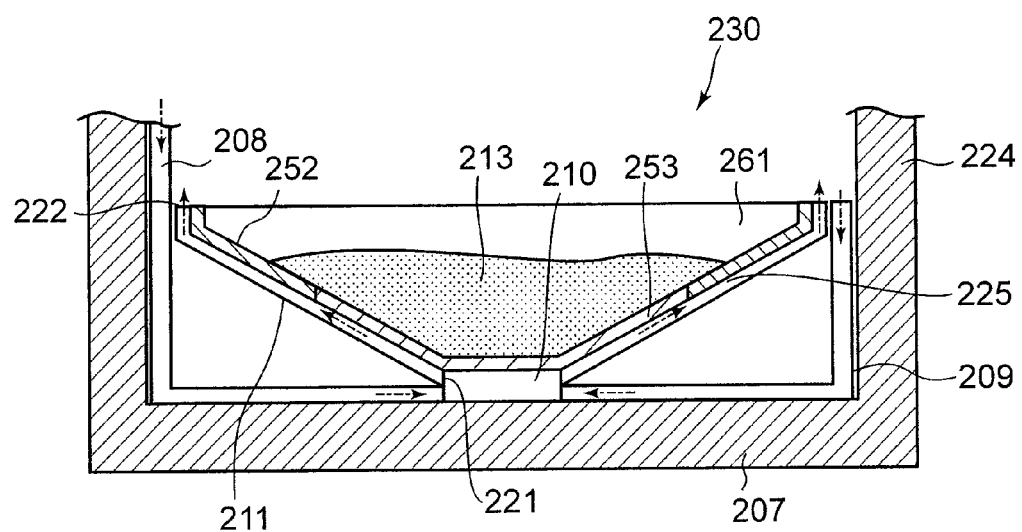
FIG. 21 is a vertical cross sectional view around a pedestal floor according to a tenth embodiment of the present invention.

FIG. 21 is a vertical cross sectional view around a pedestal floor 207 according to a tenth embodiment of the present invention.

The molten core holding device 230 according to this embodiment has first heat resistant material 252 allocated in the inner region and second heat resistant material 253 of which heat transfer coefficient is smaller than the first heat resistant material allocated in the outer region. Height of the flow path in the cooling water channel 225 is constant.

A plurality of kinds of heat resistant material may be allocated so that thermal conductivity is smaller as approaching to the perimeter.

In such a molten core holding device, heat transfer from the corium 213 to the cooling water is reduced at the peripheral region where cross sectional area in the cooling water channel 211 is larger and flow rate of the cooling water is smaller. Therefore, local rise of temperature of the cooling water channel 211 can be reduced and it is possible to hold the molten core stably and to cool continuously.

Eleventh Embodiment

Figure 22:
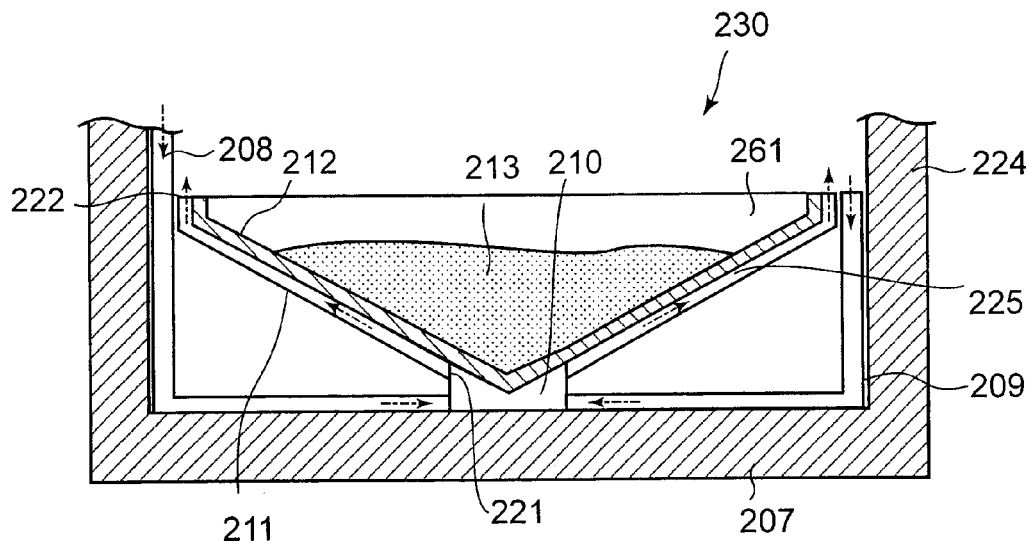
FIG. 22 is a vertical cross sectional view around a pedestal floor according to an eleventh embodiment of the present invention.

FIG. 22 is a vertical cross sectional view around a pedestal floor according to an eleventh embodiment of the present invention.

In the molten core holding device 230 according to this embodiment, a upside surface of the water supply chamber 210 has a conical shape which opens upward.

In such a molten core holding device 230, since the top surface of the water supply chamber 210 has an inclination, bubbles generated at the ceiling flow toward the cooling water channel 225 without stagnation. Therefore, local rise of temperature of the water supply chamber 210 can be reduced and it is possible to hold the molten core stably and to cool continuously.

Twelfth Embodiment

Figure 23:
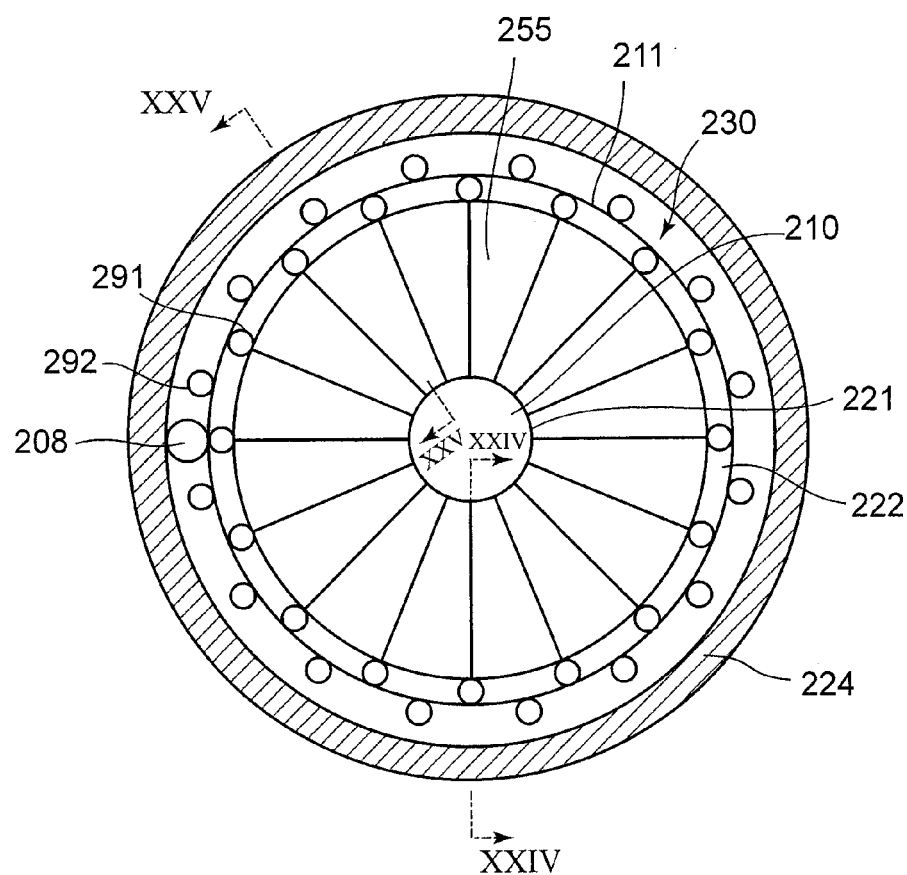
FIG. 23 is a plan view around a cooling channel according to a twelfth embodiment of the present invention.
Figure 24:
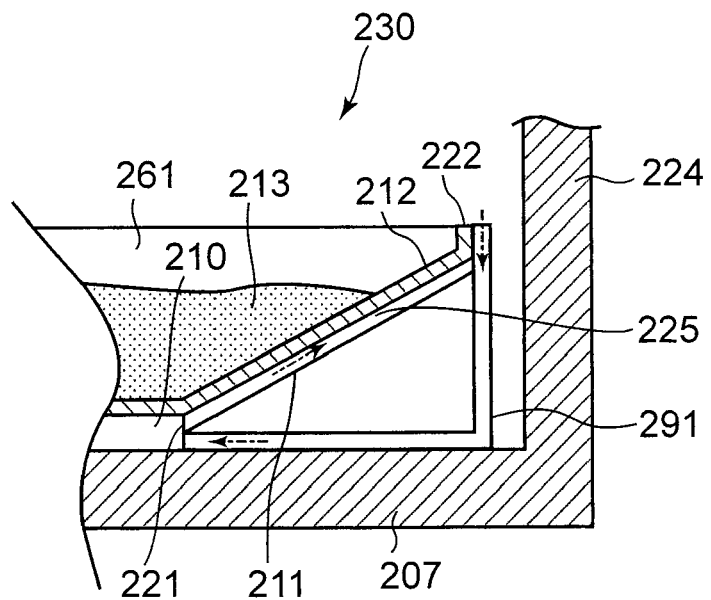
FIG. 24 is a cross sectional view as viewed in the direction of arrow XXIV-XXIV of FIG. 23.
Figure 25:
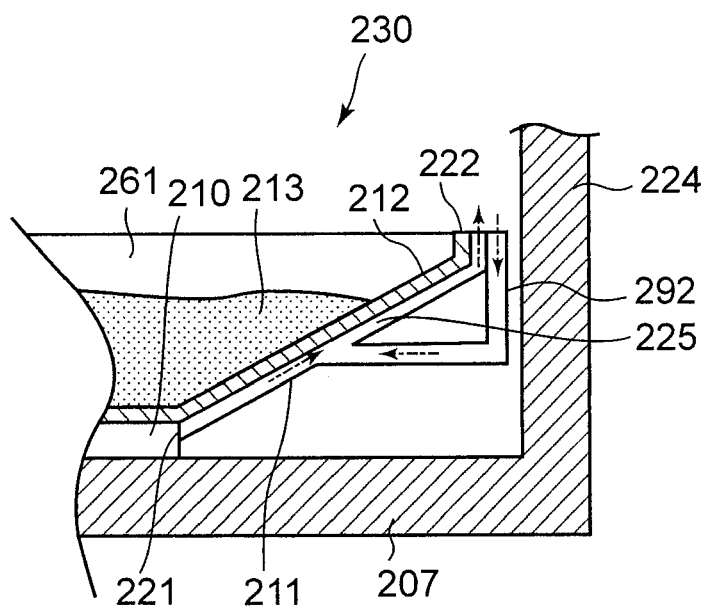
FIG. 25 is a cross sectional view as viewed in the direction of arrow XXV-XXV of FIG. 23.

FIG. 23 is a plan view around a cooling channel according to a twelfth embodiment of the present invention. FIG. 24 is a cross sectional view as viewed in the direction of arrow XXIV-XXIV of FIG. 23. FIG. 25 is a cross sectional view as viewed in the direction of arrow XXV-XXV of FIG. 23. In FIG. 23, illustration of the heat resistant material 212 is omitted.

The molten core holding device 230 of this embodiment has two kinds of water supply piping 291, 292. The first water supply piping 291 is connected to the water supply chamber 210. The second water supply piping 292 is connected to the cooling water channel 211 between the lower inlet 221 and the top exit 222.

In such a molten core holding device, cold cooling water is supplied more in a peripheral region where cross sectional area of flow path in the cooling water channel 211 is larger and flow velocity of the cooling water is smaller. Therefore, local rise of temperature of the cooling water channel 211 can be reduced and it is possible to hold the molten core stably and to cool continuously.

Thirteenth Embodiment

Figure 26:
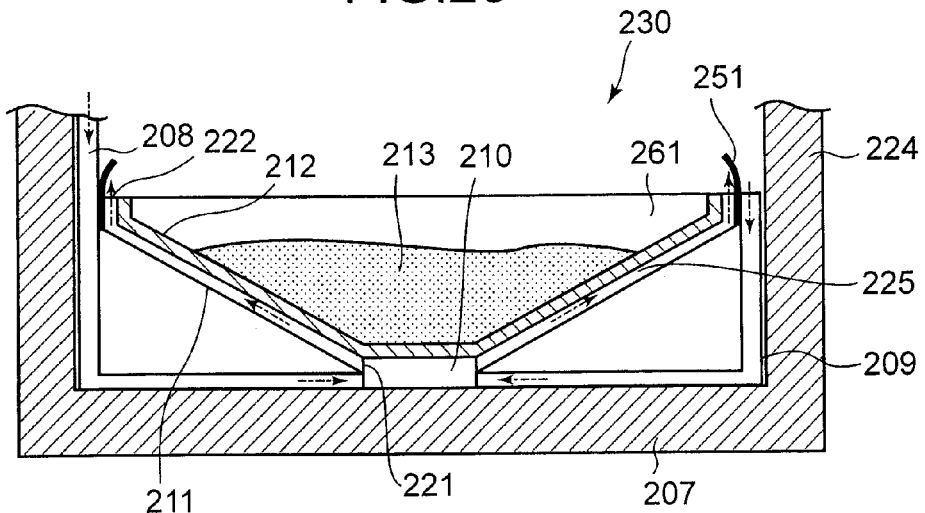
FIG. 26 is a cross sectional view around a pedestal floor according to a thirteenth embodiment of the present invention.

FIG. 26 is a cross sectional view around a pedestal floor according to a thirteenth embodiment of the present invention.

In the molten core holding device 230 according to this embodiment, dam 251 is formed between the top exit 222 and the water supply piping 209. The dam 251 leans toward the top exit 222.

Bubbles generated with heat transferred from the corium 213 in the cooling water while flowing through the cooling water channel 225 are emitted with the cooling water from the top exit 222. The dam 251 reduces direct inflow to the water supply piping 209 of the cooling water containing bubbles. Therefore, inflow to the water supply piping 209 of bubbles in the cooling water is reduced and more cooling water is supplied to the water supply chamber 210.

Fourteenth Embodiment

Figure 27:
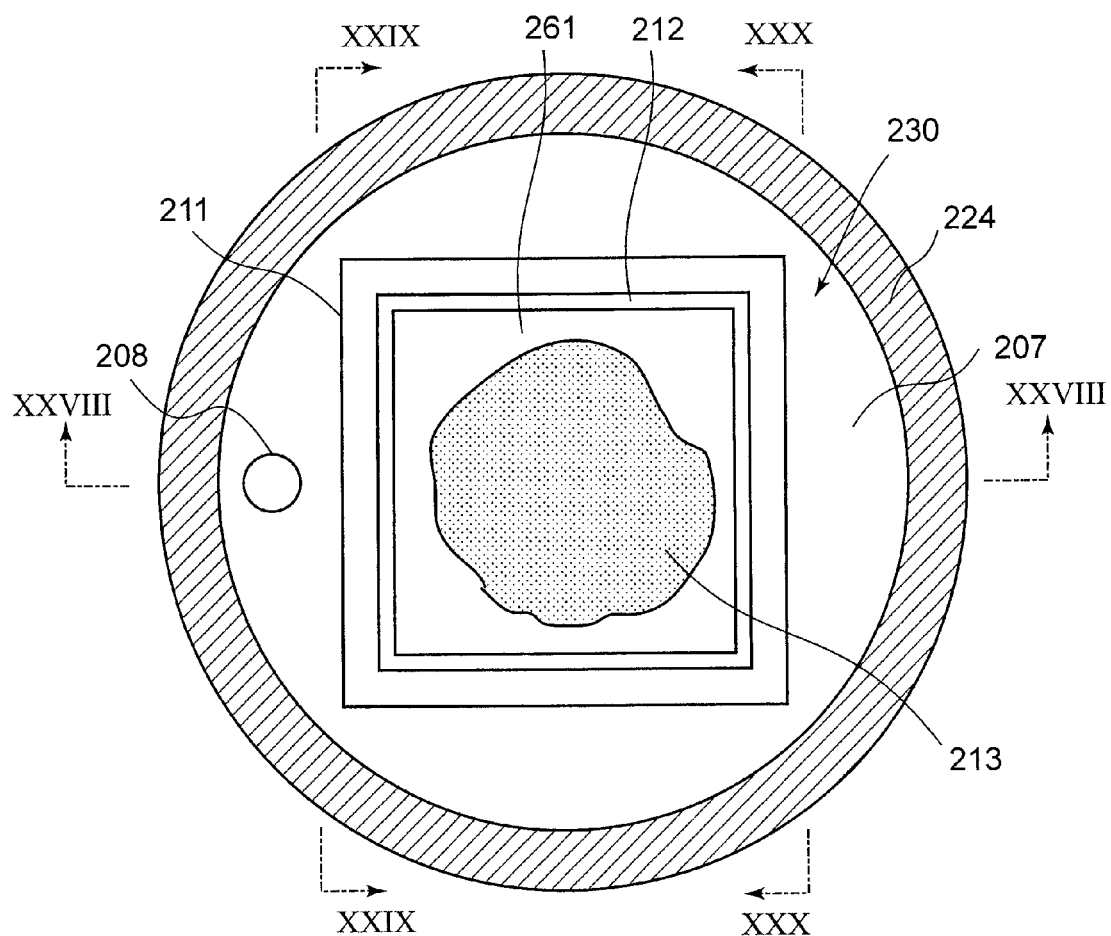
FIG. 27 is a cross sectional view around a pedestal floor according to a fourteenth embodiment of the present invention.
Figure 28:
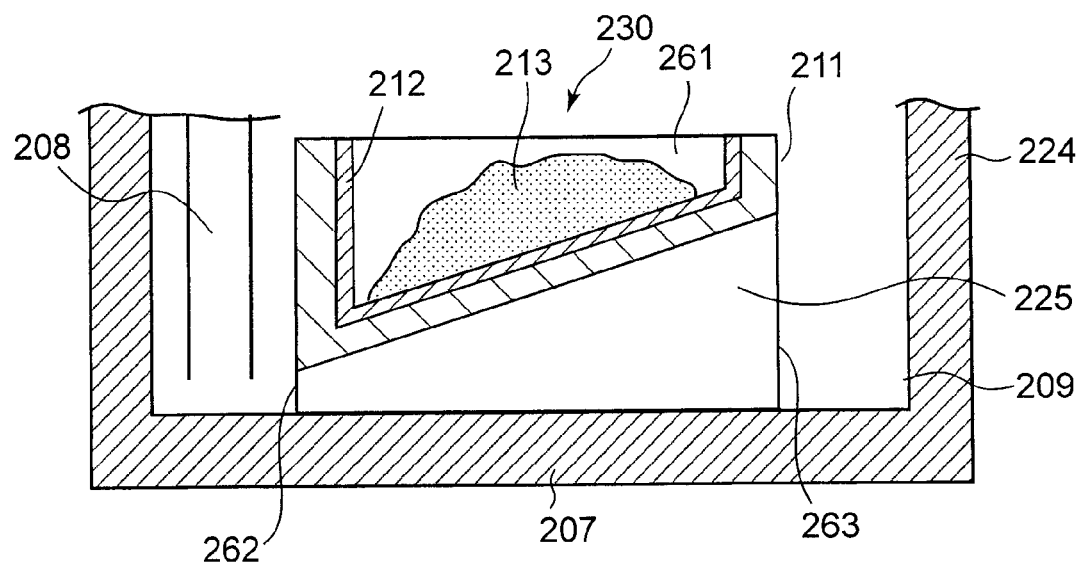
FIG. 28 is a cross sectional view as viewed in the direction of arrow XXVIII-XXVIII of FIG. 27.
Figure 29:
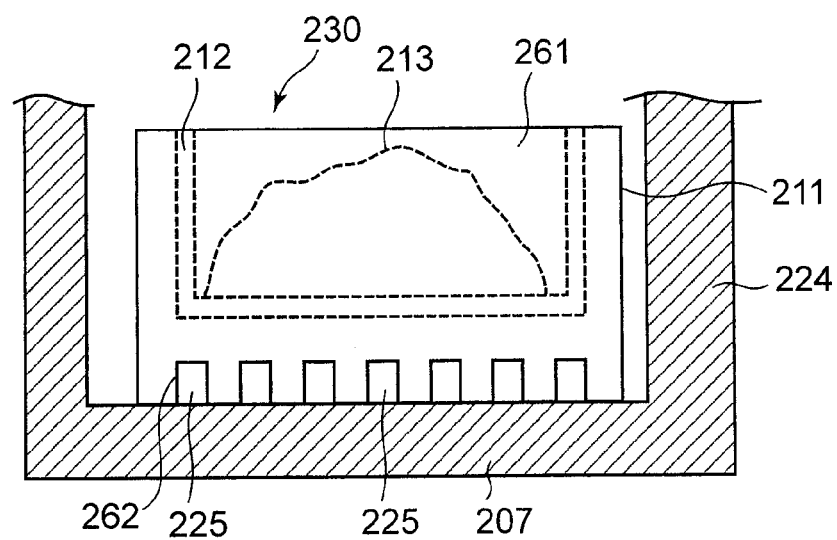
FIG. 29 is a cross sectional view as viewed in the direction of arrow XXIX-XXIX of FIG. 27.
Figure 30:
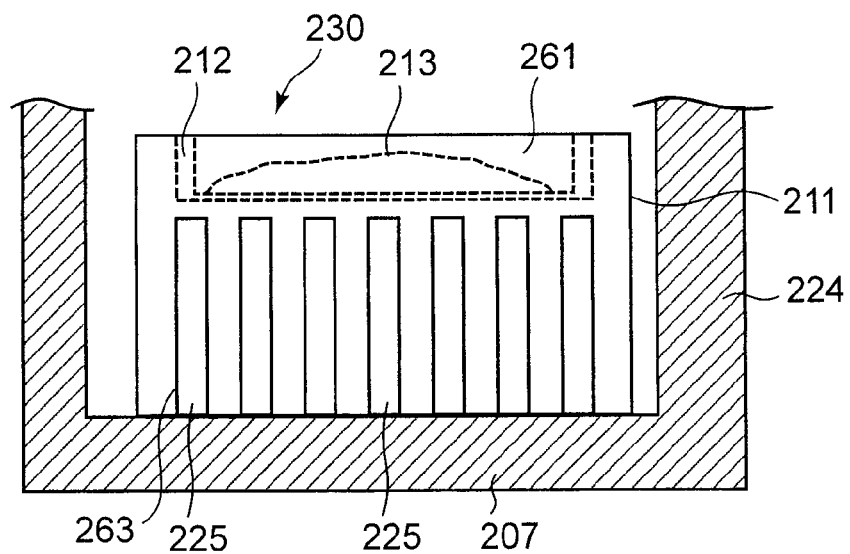
FIG. 30 is a cross sectional view as viewed in the direction of arrow XXX-XXX of FIG. 27.

FIG. 27 is a cross sectional view around a pedestal floor according to a fourteenth embodiment of the present invention. FIG. 28 is a cross sectional view as viewed in the direction of arrow XXVIII-XXVIII of FIG. 27. FIG. 29 is a cross sectional view as viewed in the direction of arrow XXIX-XXIX of FIG. 27. FIG. 30 is a cross sectional view as viewed in the direction of arrow XXX-XXX of FIG. 27.

The molten core holding device 230 according to this embodiment has the cooling channel 211 installed on the pedestal floor 207 of which projection shape is roughly square. A corium holding area 261 which consists of a leaning base and a wall which surrounds the base and spreads vertically is formed above the cooling water channel 211 and the corium is held there. The heat resistant material 212 is allocated on the surface of the cooling water channel 211 facing to the area 261 where the corium is held.

Beneath the corium holding area 261, a plurality of the cooling water channels 225 are formed in the cooling water channel 211. The cooling water channels 225 are parallel to each other. The cooling water channel 225 extends with a constant horizontal width from the inlet 262 to the exit 263. The upside surface of the cooling water channel 225 goes up from the inlet 262 toward the exit 263 along the bottom face of the corium holding area 261. The bottom surface of the cooling water channel 225 contacts with the pedestal floor 207 formed horizontally.

The injection piping 208 has an aperture near the inlet 262 and the cooling water supplied from the injection piping 208 is spilt on the pedestal floor 207 surrounded by the pedestal side wall 224 and at least a part of it flows into the cooling water channel 225 from the inlet 262. The cooling water passing through the cooling water channel 225 is emitted from the exit 263. The cooling water supplied from the injection piping 208 is stored in a space surrounded by the pedestal side wall 224, will flow into the corium holding area 261 if a water level exceeds wall surrounding the corium holding area 261 and will form a water pool on the corium 213. The cooling water forming this water pool is boiled on the surface of the corium 213 and cools corium 213.

In such a molten core holding device 230, since a top surface of the cooling water channel 225 has an inclination, bubbles generated by boiling tends to be detached by buoyancy from the top surface of the cooling water channel 225 which is a heat transfer surface and a heat transfer coefficient becomes larger. In addition, since horizontal width of the cooling water channel 225 is constant, decrease of the flow velocity of the cooling water along the top surface of the cooling water channel 225 which is a heat transfer surface from the corium 213 is reduced. Therefore, local rise of temperature of the cooling water channel 211 can be reduced and it is possible to hold the molten core stably and to cool continuously.

Fifteenth Embodiment

The molten core holding device 230 according to the fifteenth embodiment of the present invention is seen same as the molten core holding device 230 according to the fourteenth embodiment if it is seen from the top.

Figure 31:
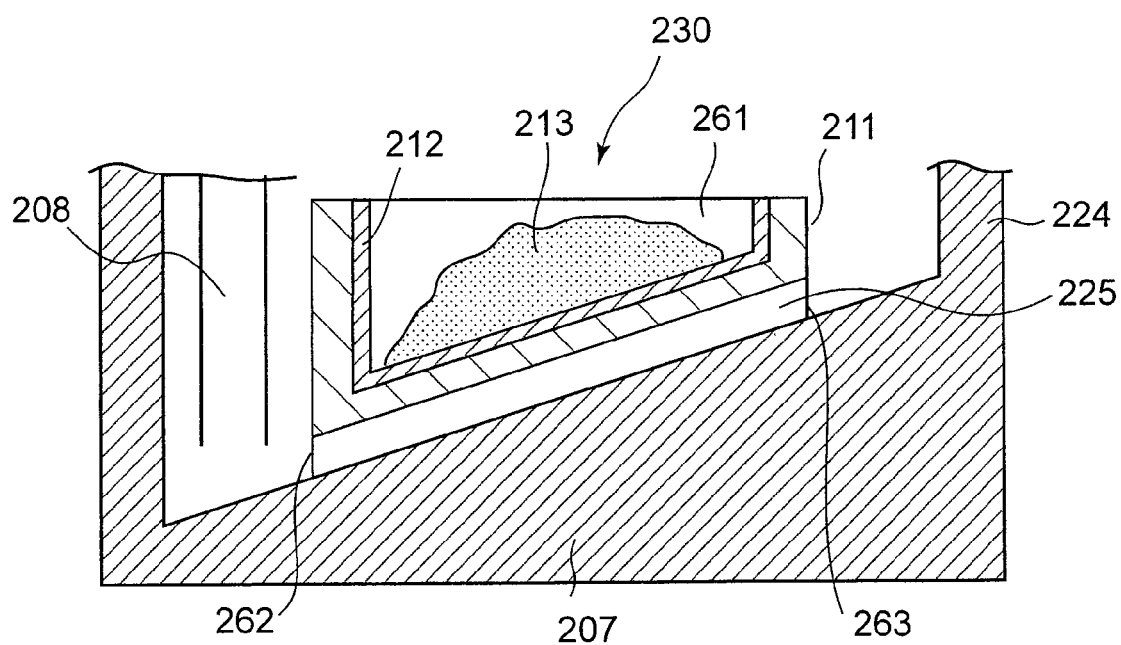
FIG. 31 is a cross sectional view around a pedestal floor according to a fifteenth embodiment of the present invention.

FIG. 31 is a cross sectional view around a pedestal floor according to a fifteenth embodiment of the present invention. FIG. 31 is corresponding to a cross sectional view as viewed in the direction of arrow XXVIII-XXVIII of FIG. 27.

The molten core holding device 230 according to this embodiment differs from the fourteenth embodiment in that the pedestal floor is not horizontal and is parallel to the bottom surface of the corium holding area. That is, the cooling water channel 225 extends with a constant cross sectional area of the flow path from the inlet 262 to the exit 263. Therefore, the cooling water flows without decrease of velocity, local rise of temperature of the cooling water channel 211 can be reduced and it is possible to hold the molten core stably and to cool continuously.

Sixteenth Embodiment

Figure 32:
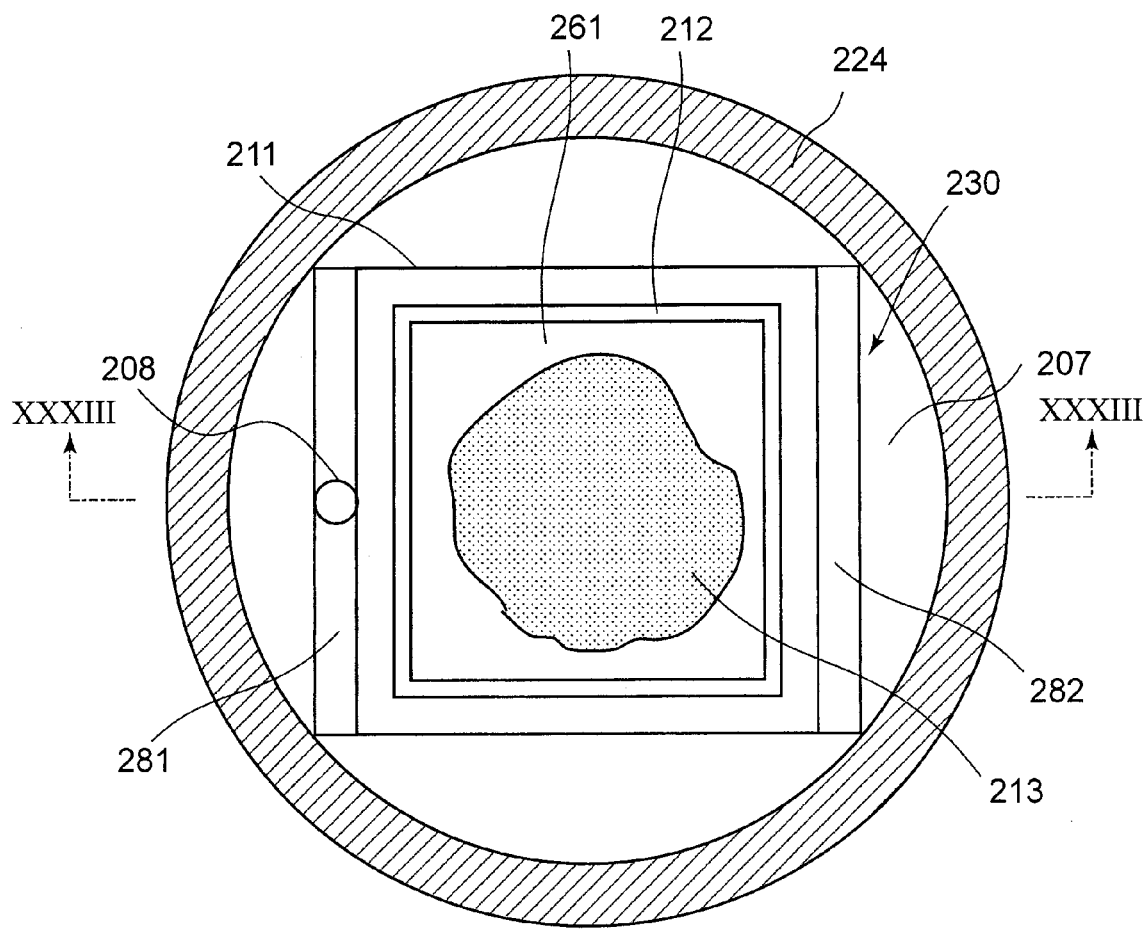
FIG. 32 is a cross sectional view around a pedestal floor according to a sixteenth embodiment of the present invention.
Figure 33:
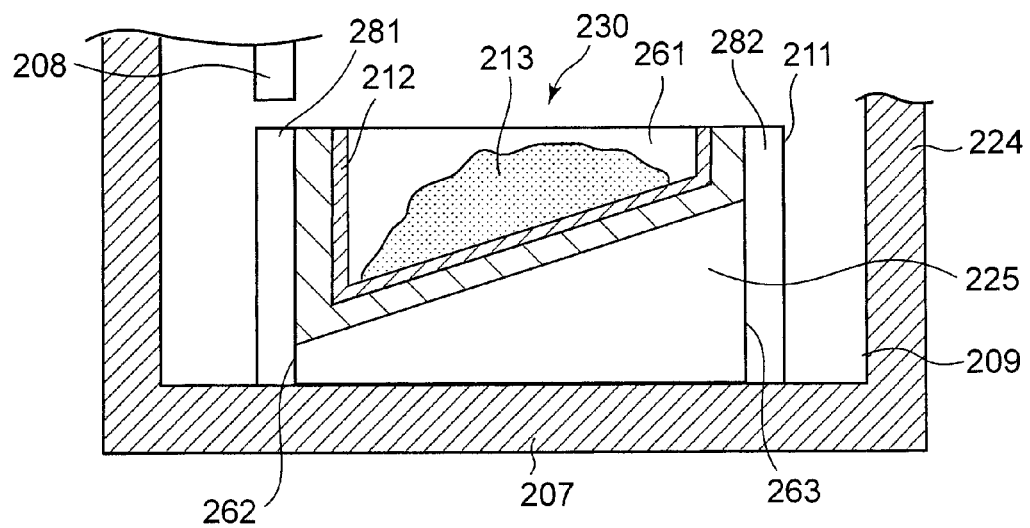
FIG. 33 is a cross sectional view as viewed in the direction of arrow XXXIII-XXXIII of FIG. 32.

FIG. 32 is a cross sectional view around a pedestal floor according to a sixteenth embodiment of the present invention. FIG. 33 is a cross sectional view as viewed in the direction of arrow XXXIII-XXXIII of FIG. 32.

The molten core holding device 230 according to this embodiment has entry side vertical flow paths 281 and exit side vertical flow paths 282 both extending vertically which are installed so as to contact respectively to the inlet 262 and the outlet 263 of the cooling water channel of the molten core holding device 230 according to the thirteenth embodiment.

The entry side vertical flow paths 281 and the exit side vertical flow paths 282 have an aperture at the top ends. The injection piping 208 extends to near the top end of the entry side vertical flow paths 281.

The cooling water emitted from the injection piping 208 flows into the entry side vertical flow paths 281, flows through the cooling water channel 225 and spills from the exit side vertical flow paths 282. A part of the cooling water spilt from the exit side vertical flow paths 282 flows into the corium holding area 261.

In such a molten core holding device 230, it becomes easy for cold cooling water supplied from the injection piping 208 to flow into the cooling water flow paths 225, and the corium 213 can be cooled effectively.

Seventeenth Embodiment

The molten core holding device 230 according to the Seventeenth embodiment of the present invention is seen same as the molten core holding device 230 according to the sixteenth embodiment shown in FIG. 32 if it is seen from the top.

Figure 34:
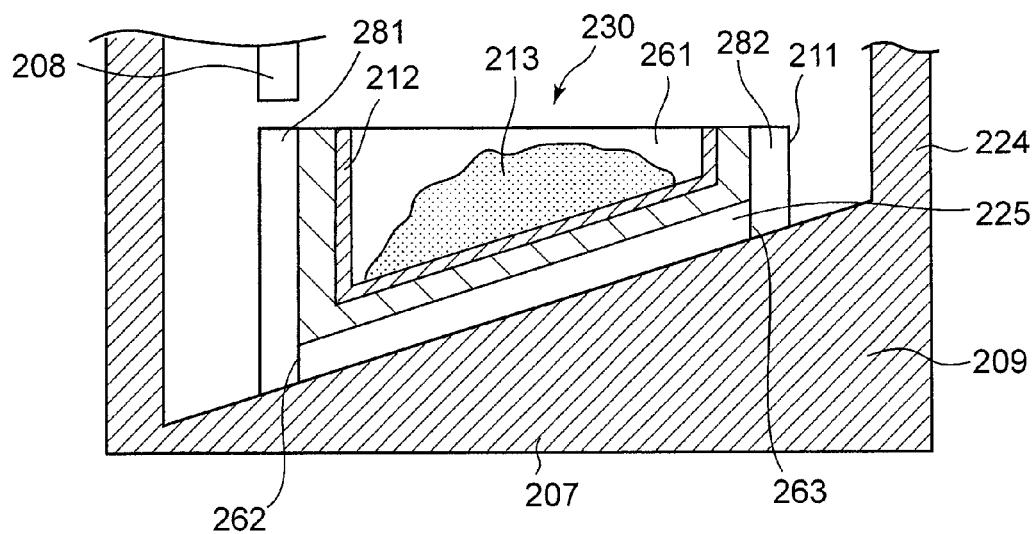
FIG. 34 is a cross sectional view around a pedestal floor according to a seventeenth embodiment of the present invention.

FIG. 34 is a cross sectional view around a pedestal floor according to a seventeenth embodiment of the present invention. FIG. 34 is a cross sectional view as viewed in the direction of arrow XXXIII-XXXIII of FIG. 32.

In the molten core holding device 230 according to this embodiment, the pedestal floor 207 according to the sixteenth embodiment is modified as it has upward inclination from the entry side vertical flow paths 281 to the exit side vertical flow paths 282

In such a molten core device 230, since cross sectional area of the cooling water flow paths 225 is kept constant from the entry side vertical flow paths 281 to the exit side vertical flow paths 282, flow velocity of the cooling water does not decrease. Therefore, the corium 213 can be cooled effectively.

Other Embodiments

Above mentioned embodiments are just examples, and the present invention is not limited to these. Also each feature of the embodiments can be combined together.

What is claimed is:

1. A core catcher for a nuclear reactor plant that has a reactor vessel, the core catcher comprising:
   a main body configured to be placed beneath the reactor vessel and having a plurality of cooling fins extending radially on a bottom surface of the main body;
   a plurality of cooling channels formed between the cooling fins in the main body and extending radially;
   a distributor arranged in a central region of the bottom surface of the main body and connected to the plurality of cooling channels so that cooling water in the distributor is led inside of the cooling channels; and
   a side wall part channel formed at a peripheral region of the main body.

2. The core catcher according to claim 1, wherein the main body is divided into a plurality of regions from a center to a periphery thereof and a number of the cooling fins extending radially in an outer region is more than a number of cooling fins extending radially in an inner region so that the cooling fins constitute more cooling channels in the outer region than the inner region.

3. The core catcher according to claim 2, wherein a plurality of the cooling channels are connected to an intermediate header being formed at a border of the regions, the intermediate header is a mixing region where cooling water which passes through each cooling channel is intermingled and supplies the cooling water from the cooling channels formed in the inner region to the cooling channels formed in the outer region.

4. The core catcher according to claim 1, wherein a heat resistant material layer is formed on a top surface of the main body.

5. The core catcher according to claim 4, wherein the heat resistant material layer is formed with one of metal oxide and basalt concrete.

6. The core catcher according to claim 4, wherein a drain sump is formed on a top surface of the heat resistant material layer.

7. The core catcher according to claim 4, wherein a sacrifice concrete layer is formed in a top surface of the heat resistant material layer.

8. The core catcher according to claim 4, wherein the heat resistant material layer is formed so that layering thickness of an outer part in a radial direction of the main body is larger than that of an inner part.

9. The core catcher according to claim 4, wherein the heat resistant material layer includes a first heat resistant material layer and a second heat resistant material layer, the second heat resistant material layer having smaller thermal conductivity than the first heat resistant material layer and being located further outward in a radial direction of the main body than the first heat resistant material layer.

10. The core catcher according to claim 1, wherein at least a part of the coolant injection piping is embedded in a pedestal side wall defining a space in which the main body is located.

11. The core catcher according to claim 1, wherein the main body comprises a combination of a plurality of body sub pieces, a plurality of cooling fins formed radially on a bottom surface of each body sub piece and cooling channels formed radially between the cooling fins.

12. The core catcher according to claim 11, wherein a side facing to a pedestal side wall of the body sub piece located at a periphery extends along the pedestal side wall.

13. The core catcher according to claim 1, further comprising a recirculation piping being configured to return the cooling water emitted from the cooling channel over the main body to the cooling channel.

14. The core catcher according to claim 13, wherein the recirculation piping includes first recirculation piping and second recirculation piping, a location where the second recirculation piping returns the cooling water to the cooling channel is downstream from a location where the first recirculation piping returns the cooling water to the cooling channel.

15. The core catcher according to claim 13, further comprising a dam located between an entering opening of the recirculation piping and an outlet opening of the cooling channel.

16. The core catcher according to claim 15, wherein the dam inclines toward the outlet opening of the cooling channel.

17. The core catcher according to claim 1, wherein at least a part of an inner upside surface of the cooling channel inclines against a horizontal line along a direction in which the cooling water flows.

18. The core catcher according to claim 17, wherein an inclination of the inner upside surface to the horizontal line is larger at downstream of the direction through which the cooling water flows.

19. The core catcher according to claim 1, wherein a plurality of dimples are formed on an inner wall of the cooling channel.

20. The core catcher according to claim 1, further comprising:
    detection means for detecting an indication of dropping of a molten core; and
    cooling water supply means for supplying the cooling water to the cooling channel through the cooling water injecting piping if the detection means detects the indication.

21. The core catcher according to claim 20, wherein the cooling water supply means includes:
    a cistern located above an outlet of the cooling channel and being configured to store the cooling water;
    an injection valve inserted in the cooling water injecting piping; and
    an injection valve controller connected to the detection means and being configured to open the injection valve if the detection means detects the indication.

22. The core catcher according to claim 21, wherein
    the detection means detects temperature of atmosphere of a lower part of the reactor vessel, and
    the injection valve controller opens the injection valve if the temperature of atmosphere of the lower part of the reactor vessel exceeds a predetermined temperature.

23. The core catcher according to claim 21, wherein
    the detection means detects temperature of a lower head of the reactor vessel, and
    the injection valve controller opens the injection valve if the temperature of the lower head of the reactor vessel exceeds a predetermined temperature.

24. The core catcher according to claim 21, wherein
    the detection means detects a water level inside the reactor vessel, and
    the injection valve controller opens the injection valve if a certain period elapses while the water level inside the reactor vessel remains less than a specific water level.

25. The core catcher according to claim 20, wherein the cooling water supply means includes:
    a cistern configured to store the cooling water;
    a pump configured to send out the cooling water to the water supply chamber from the cistern; and
    a pump controller connected to the detection means and configured to start the pump if the detection means detects the indication.

26. The core catcher according to claim 1, wherein the cooling channel is formed so that height of a flow area at an outer position of a radial direction is smaller than an inner position.

27. A core catcher for catching core debris generated when a reactor core in a reactor vessel melts and penetrates the reactor vessel, the core catcher comprising:
    a cooling channel having a plurality of fins attached to a bottom thereof and defining a debris holding region and a plurality of cooling water flow paths, the debris holding region being surrounded by a bottom surface inclined with respect to a horizontal plane and a wall spreading vertically at a periphery of the bottom surface and being opened upward, the cooling water flow paths extending parallel to each other with a fixed horizontal width along the bottom surface of the debris holding region as a top surface of the cooling water flow rises; and
    heat resistant material attached to a surface of the cooling channel facing to the debris holding region,
    wherein the cooling water flow paths are formed between the fins.

28. The core catcher according to claim 27, wherein lengths of the cooling water flow paths are equal to each other.

* * * * *